United States Patent [19]
Sotelo et al.

[11] Patent Number: 4,543,665
[45] Date of Patent: Sep. 24, 1985

[54] SPEAKERPHONE WITH WIRELESS INFRARED MICROPHONE

[75] Inventors: James M. Sotelo, Scotts Valley; Peter J. Porozoff, Aptos, both of Calif.

[73] Assignee: Plantronics, Inc., Santa Cruz, Calif.

[21] Appl. No.: 397,882

[22] Filed: Jul. 13, 1982

[51] Int. Cl.[4] .............................................. H04B 9/00
[52] U.S. Cl. .............................. 455/606; 179/2 EA; 455/603; 455/613; 455/618; 455/619
[58] Field of Search ............... 455/603, 606, 607, 613, 455/617, 618, 619, 221, 225, 229, 49, 52, 58, 103, 133, 134, 135; 179/2 EA, 82

[56] References Cited
U.S. PATENT DOCUMENTS

| | | | |
|---|---|---|---|
| 4,221,932 | 9/1980 | Anglikowski et al. | 179/2 EA |
| 4,224,482 | 9/1980 | Lese et al. | 179/157 |
| 4,241,236 | 12/1980 | Nash | 455/613 |
| 4,400,584 | 8/1983 | Vilmur | 179/2 EA |

FOREIGN PATENT DOCUMENTS 2823931 12/1979 Fed. Rep. of Germany ...... 455/606

OTHER PUBLICATIONS

"Litephone", offered by Controlonics Corporation, sales brochure.

Primary Examiner—Joseph A. Orsino, Jr.
Attorney, Agent, or Firm—Arnold, White & Durkee

[57] ABSTRACT

A speakerphone instrument is disclosed having a remote microphone unit providing infrared radiation carrier transmission of voice to a base station coupled to a telephone line. Voice controlled switching of the infrared carrier may be utilized to reduce power consumption. A local microphone in the base station is operable during periods when the remote microphone unit is not transmitting or if the signal-to-noise ratio of the infrared carrier becomes unsatisfactory for voice communication, to pick-up ambient sound and make available a microphone signal for transmission over the telephone line.

5 Claims, 21 Drawing Figures

SPEAKERPHONE WITH WIRELESS INFRARED MICROPHONE

BACKGROUND OF THE INVENTION

The present invention relates to telephone subscriber instruments; and more particularly, it relates to speakerphone instruments.

Speakerphone instruments are well known, e.g., the Bell 4A unit. This type of communication instrument, while providing hands-free telephonic communication capability to a user, suffers from poor quality in the voice transmission. Specifically, the voice transmission from such units carries an echo which is particularly discernible to the listener. The echo results because of the many paths over which the acoustic energy of the user's speech travels in reaching the microphone.

In an effort to improve the quality of voice transmission in speakerphone instruments, several approaches to solving the echo problem have been tried. These approaches include the use of elaborate acoustic and electronic echo-cancelling techniques, such as those developed for satellite communications. The cost of implementing such techniques in a telephone subscriber instrument are prohibitively expensive.

The most effective solution to the echo problem has been to merely place the microphone in close proximity to the user during talking. In order to place the microphone in proximity to the user, it has been suggested to use a boom-mounted microphone or to use a long microphone cord. Both approaches suffer apparent disadvantages. Another suggestion has been to use a wireless microphone.

Wireless microphones can be implemented using either a radio frequency (RF) transmission link or a diffuse optical radiation transmission link, i.e., an infrared (IR) link. An RF link is unsuitable because of the inability to maintain privacy in communications due to the difficulty to restrict the spread of an RF transmission. Additionally, an RF link is susceptible to interference. An IR link is preferable to an RF link in the aspects of privacy and interference problems, but the power consumption is substantially greater.

SUMMARY OF THE INVENTION

In accordance with the present invention, a cordfree speakerphone telephone instrument is described having a remote microphone linked to a base station by an infrared radiation carrier. The instrument includes a second, local microphone proximate the base station. Further included are means for sensing the presence of the remote infrared carrier and means for switching to the local microphone in the base station upon detecting an unsatisfactory signal-to-noise ratio of the remote infrared carrier. Voice controlled switching of the infrared carrier may optionally be provided, to reduce battery drain in the remote microphone.

In voice controlled switching of the infrared radiation carrier, the infrared radiation source is transmitting only when the user is talking. When the user stops talking, the source stops transmitting the infrared radiation carrier.

Voice controlled switching of the infrared carrier transmitted by the remote microphone unit of a speakerphone instrument presents operational consequences which are addressed by additional aspects of the present invention. These include the possible clipping of the first syllables of a user's speech due to the inherent delay in carrier turn-on, and an abrupt and total silence on the telephone line when the user stops talking and there is no carrier. Such consequences are of concern for a telephone subscriber instrument because they are an annoyance to the listener.

The present invention obviates these concerns by utilizing the local microphone. This microphone picks-up the onset of user speech and picks-up ambient sound during the periods when the remote microphone unit is not transmitting. At the base station of the speakerphone, selection is made between remote microphone unit and local microphone electrical voice signals for presentation to the telephone line transmit circuit. Selection is based upon whether or not there is voice transmission from the remote microphone unit. Thus, before a user's talking produces a voice transmission over the infrared link and when a user is not talking, the local microphone electrical voice signal is presented to the telephone lines. As a result, an electrical voice signal is always presented to the telephone line and there are no periods of dead silence. Also, even the first syllables of a user's speech are presented to the telephone lines. If the instrument uses a remote microphone which does not include voice switching, it operates to automatically select the local microphone if the signal-to-noise ratio of the remote microphone infrared carrier transmission becomes unsatisfactory for voice communications. This could result if the user obstructs the infrared path between the remote microphone and base station, or if the batteries in the remote microphone become discharged, or of the user moves out of range temporarily.

As used herein, local microphone electrical voice signals refers to audio frequency electrical signals produced by the local microphone, and representative of the acoustic signal (voice or noise) picked-up by the local microphone. And as used herein, remote microphone unit electrical voice signals refers to audio frequency electrical signals representative of a user's acoustic voice signal recovered in the base station from a received transmission over the infrared link between the remote microphone unit and the base station. In both instances, electrical voice signals designate not only the signals produced by a microphone transducer, but signal processed versions (i.e., amplified, filtered, etc.) also. Additionally, an audio frequency is one in the range of 15 to 20,000 Hz.

The local microphone may be housed within the base station. Alternatively, the local microphone may be disposed outside the base station in a separate housing and coupled by a wired connection.

Selection in the base station between the local and remote microphone electrical voice signals is accomplished by making a determination of the presence of an infrared carrier and, in the case of voice switched remote microphone carrier, the presence of an audio frequency signal contained in the carrier. This is done by recovering from an infrared carrier transmission a remote microphone unit electrical voice signal, and monitoring for the presence of audio frequency signals. When it is detected that both a carrier transmission is present and an audio frequency signal is present, the recovered remote microphone unit electrical voice signal is made available for presentation to the telephone line. If both signals are not present, the local microphone electrical voice signal is selected.

Another consequence of voice controlled switching of the infrared carrier is the occurrence of a burst of audio frequency noise (squelch tail) just prior to the onset of the period of dead silence. This results from a loss of carrier prior to squelching the audio channel. The present invention prevents the occurrence of squelch tails by delaying the turn-off of the infrared carrier for a prescribed period of time after the user has stopped talking, and by establishing a delay of a shorter duration in the audio frequency detector at the base station. Accordingly, control of the selection between the remote and local microphone electrical voice signals will direct selection of the local microphone electrical voice signal before the carrier is turned-off, thus preventing presentation of the squelch tail to the telephone lines.

These and other aspects of the present invention will become better understood from the detailed description of an illustrative embodiment which follows.

BRIEF DESCRIPTION OF THE DRAWINGS

A written description setting forth the best mode presently known for carrying out the present invention, and of the manner of implementing and using it, is provided by the following detailed description of an illustrative embodiment which is shown in attached drawings wherein.

DETAILED DESCRIPTION OF AN ILLUSTRATIVE EMBODIMENT

A. Apparatus in General

Figure 1:
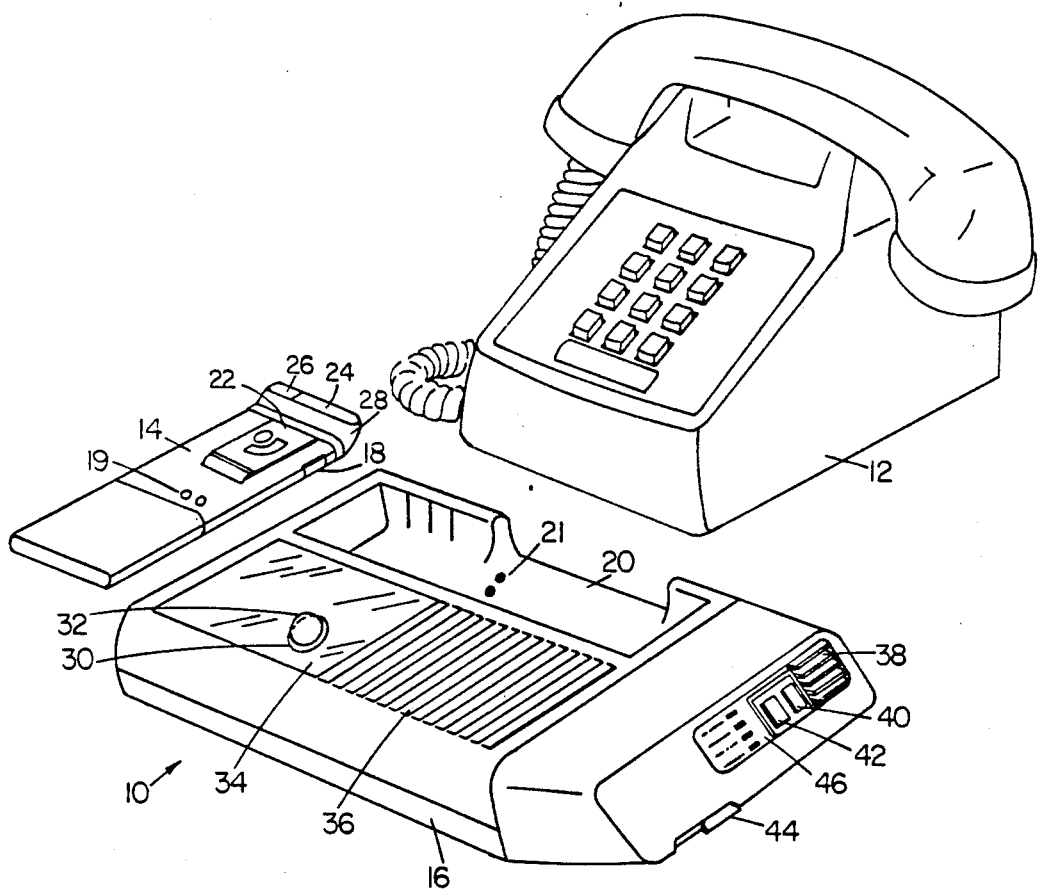
FIG. 1 is a perspective view of the cordfree, infrared speakerphone apparatus.

Referring now to FIG. 1, cordfree, infrared speakerphone apparatus in accordance with the present invention is shown in a perspective view and positioned adjacent a conventional telephone 12 to which it is coupled. The speakerphone apparatus has a remote microphone unit 14 and a base station 16.

The remote microphone unit 14 is housed in an enclosure sized to fit in a shirt pocket. The remote microphone unit includes a manually actuable switch 18 for turning the unit on and off, and for going off and on hook with the apparatus as a whole. The remote microphone unit has a self-contained battery power supply rechargeable through terminals 19 when the remote unit is placed in cradle 20 of base station 16 and terminals 19 are in contact with terminals 21 in the bottom of cradle 20.

The remote microphone unit is preferably equipped with a pocket clip 22 for holding the unit within a shirt pocket and maintaining the infrared radiation source oriented for propagating the infrared radiation carrier into the space of the surrounding room. The infrared radiation source is placed under a protective cover 28. The microphone transducer 26 of unit 14 is mounted adjacent thereto.

Base station 16 houses the infrared carrier transmission receiver. An infrared carrier transmission from remote microphone unit 14 is detected by infrared radiation detector 30. To concentrate the diffuse infrared radiation of the carrier onto the detector, optics 32 is provided. The optics includes a lens preferably in accordance with the teachings of co-pending application Ser. No. 165,070, entitled "Aspherical Lens for Concentrating Diffuse Optical Radiation", in the name of David Silverglate as inventor, and assigned to the assignee of this application. The disclosure of that application is hereby incorporated by reference. The infrared radiation detector 30 and optics 32 are covered by an infrared radiation transmissive protective cover 34.

A grille section 36 in the base station housing covers an acoustic speaker producing an acoustic voice signal from an incoming electrical voice signal transmitted over telephone lines to the base station from a distant party.

In the forward portion of the base station housing, a grille 38 overlays a local microphone transducer for picking-up ambient, background room noise and the onset of the speakerphone user's speech. The local microphone can also be used as the sole microphone when the speakerphone instrument is operated in the "local" mode.

Further included in the front panel portion of the base station housing are various controls including speakerphone on/off button 40, mute button 42 and volume control 44. Additionally, a series of visual indicators 46 are provided to indicate the operational mode of the unit.

B. Generalized Operation and Functional Block Diagrams of Apparatus

Figure 2:
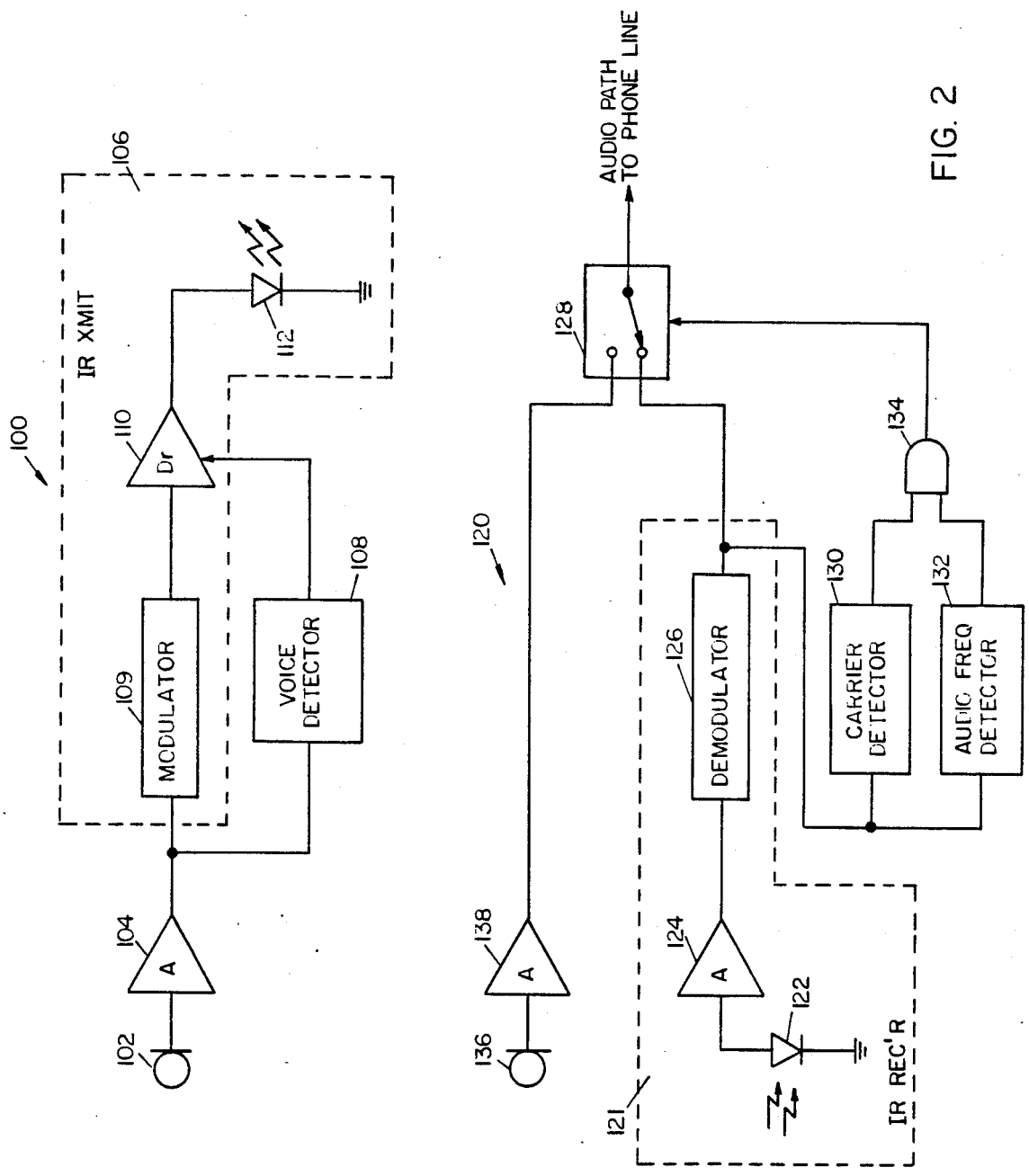
FIG. 2 is a generalized functional block diagram of the remote microphone unit and a portion of the base station unit of the speakerphone apparatus.

Referring now to FIG. 2, generalized functional block diagrams of the remote microphone unit 100 and a portion of the speakerphone base station 200 are presented. The remote microphone unit includes a microphone transducer 102 for converting a user's acoustic voice signal into a representative electrical voice signal. This signal is amplified by amplifier 104 and applied to an infrared transmitter 106 and a voice detector 108. Voice detector 108 is optional and is required only of voice controlled switching of the remote microphone infrared carrier is desired.

The infrared transmitter includes an FM Modulator 109 producing a sub-carrier signal modulated by the microphone electrical voice signal. This sub-carrier signal is applied to a driver circuit 110 driving an infrared source 112 which produces an infrared radiation transmission carrier. The FM modulated sub-carrier signal is used to amplitude-modulate the infrared radiation transmission carrier.

Voice detector 108, in response to the presence of a microphone electrical voice signal, provides an enabling control signal to the infrared transmitter 106. Specifically, the signal is applied to driver 110. Thus, when voice is detected, driver 110 is enabled. Otherwise, driver 110 is disabled.

With reference now to base station 120, included therein is an infrared receive circuit 121 for recovering the remote microphone electrical voice signal from an infrared radiation carrier transmission. The receive circuit comprises an infrared radiation detector 122, an amplifier 124, and an FM Demodulator 126. The infrared radiation detector 122 operates as a detector of the infrared carrier and also as a demodulator of the infrared carrier.

The electrical signal produced by detector 122 is a reproduction of the sub-carrier signal produced at the output of modulator 109 in the remote microphone unit. This reconstructed sub-carrier signal is demodulated in FM Demodulator 126 to provide a reproduction of the remote microphone electrical voice signal that was at the output of microphone amplifier 104 in the remote unit. The recovered signal is made available to selection switch 128, and it is also applied to carrier detector 130 and audio frequency detector 132. Selection switch 128 is controlled by AND logic 134 which receives as inputs the carrier detector and audio frequency detector outputs. When carrier detector 130 detects that the receive circuit 121 is receiving an infrared radiation carrier transmission and audio frequency detector 132 detects that audio frequency signals (i.e., the user's voice) are present in the recovered signal, selector switch 128 is directed to select the output of the receive circuit. If the remote microphone does not utilize voice switching of the infrared carrier, detector 132 and logic 134 are deleted from the base station; and the output of carrier detector 130 is applied directly to switch 128.

Base station 120 further includes a local microphone transducer 136 for converting ambient acoustic signals into representative electrical signals which will be referred to as local microphone electrical voice signals. The local microphone electrical voice signals are amplified by amplifier 138 and made available to selection switch 128. When the conditions for selection of the output of receive circuit 121 are not met, the local microphone electrical voice signals are selected for presentation to the phone line.

Figure 3:
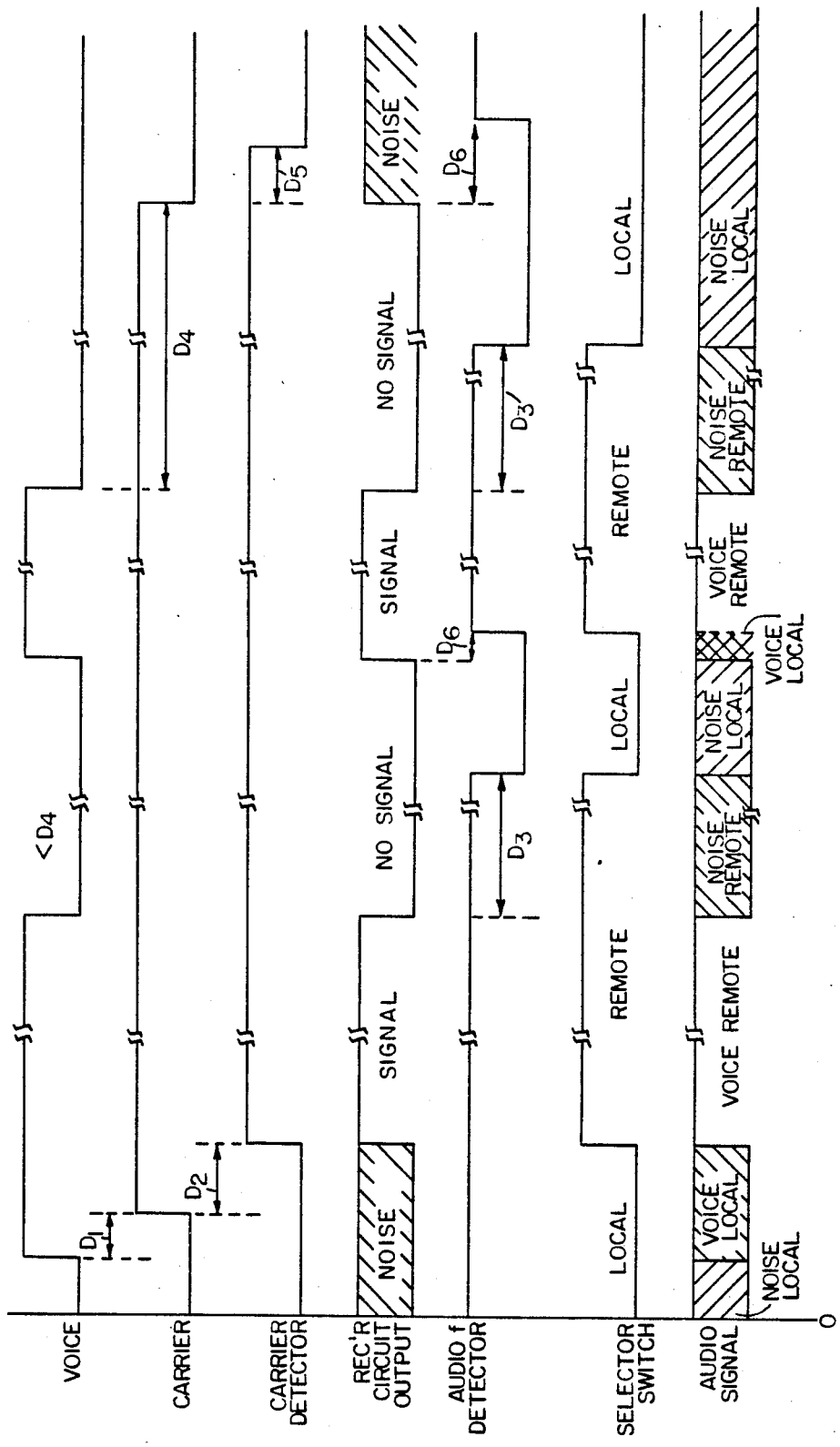
FIG. 3 is a timing diagram illustrating functional operation of the speakerphone apparatus.

The diagram of FIG. 3 illustrates the operation of the speakerphone apparatus diagrammed in FIG. 2. In FIG. 3, there are represented several operational conditions. Specifically, represented is the presence and absence of a user's voice and the attendant presence or absence of infrared radiation carrier transmission from the remote microphone unit. These two conditions are represented in the two condition traces in FIG. 3 identified as "Voice" and "Carrier". The following three condition traces indicate the presence or absence of a carrier detection ("Carrier Detect"), the presence or absence of a receiver circuit output signal ("Receiver Circuit Output"), and the presence or absence of audio frequency in the receiver circuit output ("Audio f Detector"). The next condition trace represents the condition of the selector switch control signal ("Selector Switch"), as directing selection of either the local microphone electrical voice signal or the recovered remote microphone electrical voice signal. Finally, the last condition trace ("Audio Signal") is a representation of the character and source of the audio signal being presented to the phone line.

FIG. 3 shows that when the user is not talking, and consequently there is no infrared radiation carrier transmission, the selector switch routes the local microphone electrical voice signals to the phone line. Of course, the local microphone is picking up ambient sounds within the room in which the speakerphone is being used; therefore, only ambient or background noise would be presented to the phone line. Since there is no infrared radiation carrier, the receiver circuit output has noise present, some of which would be at audio frequencies thereby causing the audio frequency detector to indicate an audio frequency detection.

At the onset of user speech, whereupon Voice is present, infrared radiation carrier transmission from the remote microphone unit is enabled. There is, of course, a delay associated with carrier turn-on. This would result in possible clipping of the first syllable of a user's speech; however, because of the local microphone, the first portion of the user's speech is picked-up and presented to the phone line. Thus, in FIG. 3, Carrier is shown delayed by $D_1$, and the Audio Signal is shown to be voice from the local microphone.

When there exists infrared radiation carrier transmission, the Receiver Circuit Output condition changes from noise to an actual remote microphone electrical voice signal. Correspondingly, Carrier Detector condition gives an indication that there is a carrier detection. There is, however, a delay $D_2$ between the time of actual infrared radiation carrier transmission and an indication of carrier detection in the speakerphone base station. When there is an infrared radiation carrier transmission detection, the Selector Switch condition changes from the local microphone electrical voice signals to the remote microphone electrical voice signal available from the infrared receiver circuit output. The Audio Signal then becomes voice from the remote microphone unit.

The speakerphone continues to operate in the remote mode as long as the user continues talking. In this regard it is to be noted that provided a cessation of user talking is shorter than a prescribed time delay $D_4$, which suitably may be on the order of 500 milliseconds, as would be the case for the brief breaks which occur during normal speech, the infrared radiation carrier transmission (Carrier) is maintained.

In the base station, however, there is an absence of output signal from the infrared receiver circuit upon a cessation of user talking. as shown by the Receiver Circuit Output condition trace. The absence of an output signal is detected by the audio frequency detector. If the absence of signal output from the infrared receiver circuit is for a time greater than a prescribed delay time $D_3$, there is a change in state of Audio f Detector. Suitably, the delay time $D_3$ is on the order of 200 milliseconds.

Upon a change of state of the audio frequency detector in response to an absence of signal output from the infrared receiver circuit, the Selector Switch condition changes to select the local microphone electrical voice signal. Of course, since the user is not talking, the local microphone electrical voice signal will comprise ambient, room background noise.

When Voice is again present, there is a signal present immediately at the infrared receiver circuit output, since the Carrier was not turned off. After a short delay time $D_6$ in the audio frequency detector, the Audio f Detector condition changes back and the Selector Switch condition again presents the remote microphone electrical voice signal to the phone line. During the brief delay time $D_6$, the initial portion of the user's speech is made available in Audio Signal via the local microphone.

When there is a cessation of user talking for a period of time greater than the delay time $D_4$, infrared radiation carrier transmission from the remote microphone unit terminates. Due to a delay time $D_5$ in the carrier detector, the Carrier condition does not change immediately. However, noise is immediately present at the output of the infrared receiver circuit. As noted previously, passage of a squelch tail to the phone line is avoided by having the Selector Switch condition place the local microphone electrical voice signal in Audio Signal in advance of the loss of carrier. This is accomplished by reason of the Audio f Detector condition changing after the cessation of user talking, but before termination of carrier transmission. Although upon loss of carrier audio frequency noise will be present at the output of the infrared receiver circuit, the attack time of the audio frequency detector is such that it will not change its state back until passage of a delay time period $D_6$, which is less than the attack delay time $D_5$ of the carrier detector. Thus, the Selector Switch condition as shown continues to place the local microphone electrical voice signal in Audio Signal.

C. Remote Microphone Unit

1. Detailed Block Diagram

Figure 4:
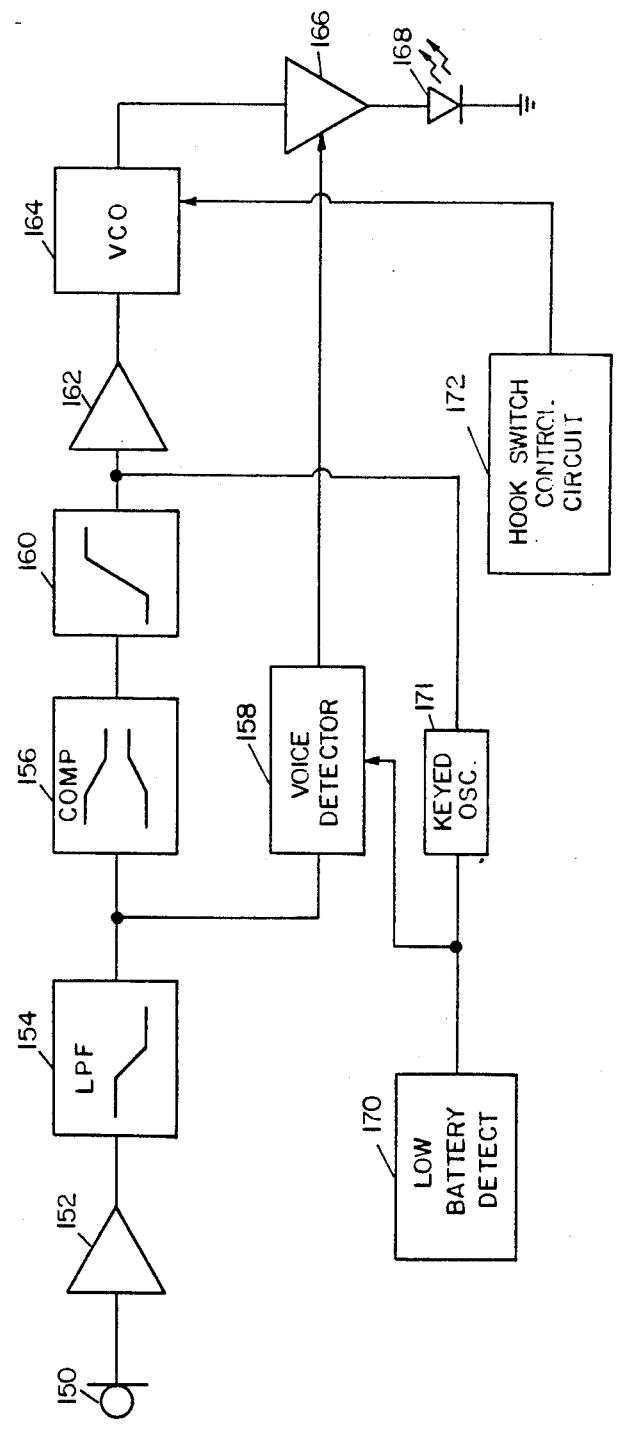
FIG. 4 is a detailed functional block diagram of the remote microphone unit.

Referring to FIG. 4, there is presented a detailed functional block diagram of the speakerphone remote microphone unit 100. In the diagram, it is shown that an electret microphone 150 picks-up acoustic voice signals and produces remote microphone electrical voice signals which are amplified in amplifier 152 and filtered by low pass filter 154. The signals are then applied to an electrical signal compressor 156 and voice detector 158. Compressor 156 is used in conjunction with an expander in the base station infrared receiver to reduce the amount of channel noise at the receiver output. The output of compressor 156 goes through a pre-emphasis network 160 and a buffer 162 before modulating a sub-carrier signal produced by a voltage controlled oscillator (VCO) 164. Pre-emphasis is used to emphasize the higher frequencies of the electrical voice signals, with de-emphasis being provided at the infrared receiver to recover the original signal. By using this technique, the transmission bandwidth of the sub-carrier is more efficiently used and signal-to-noise ratios are improved.

The modulated sub-carrier at the VCO output is coupled to a driver stage 166 which drives an infrared radiation source 168. Driver stage 166 is controlled by voice detector 158 to turn the infrared radiation carrier on and off.

There is further provided in the remote microphone unit a low battery detection circuit 170. When the battery power supply for the remote microphone unit reaches a prescribed low voltage, the low battery detection circuit overrides the control the voice detector circuit 158 has over driver stage 166, so as to maintain the infrared radiation carrier even though there is a cessation in user talking. At the same time, the low battery detector keys up an 8 KHz oscillator 171. The oscillator output signal, in the form of a sawtooth waveform, is applied to the VCO. This condition is detected in the base station and an indication is given to the user that the battery is low.

There is further included in the remote microphone unit a hook switch control circuit 172 for providing remote control of the off-hook and on-hook conditions of the speakerphone. On-hook signalling at the conclusion of a telephone conference by means of the hook switch control circuit involves maintaining power to the unit for a period of time during which an input signal is applied to the VCO to shift up the sub-carrier center frequency. This shift in sub-carrier center frequency is detected in the speakerphone base station as an indication to go back on-hook.

2. Remote Microphone Unit Schematic Diagrams

Figure 5:
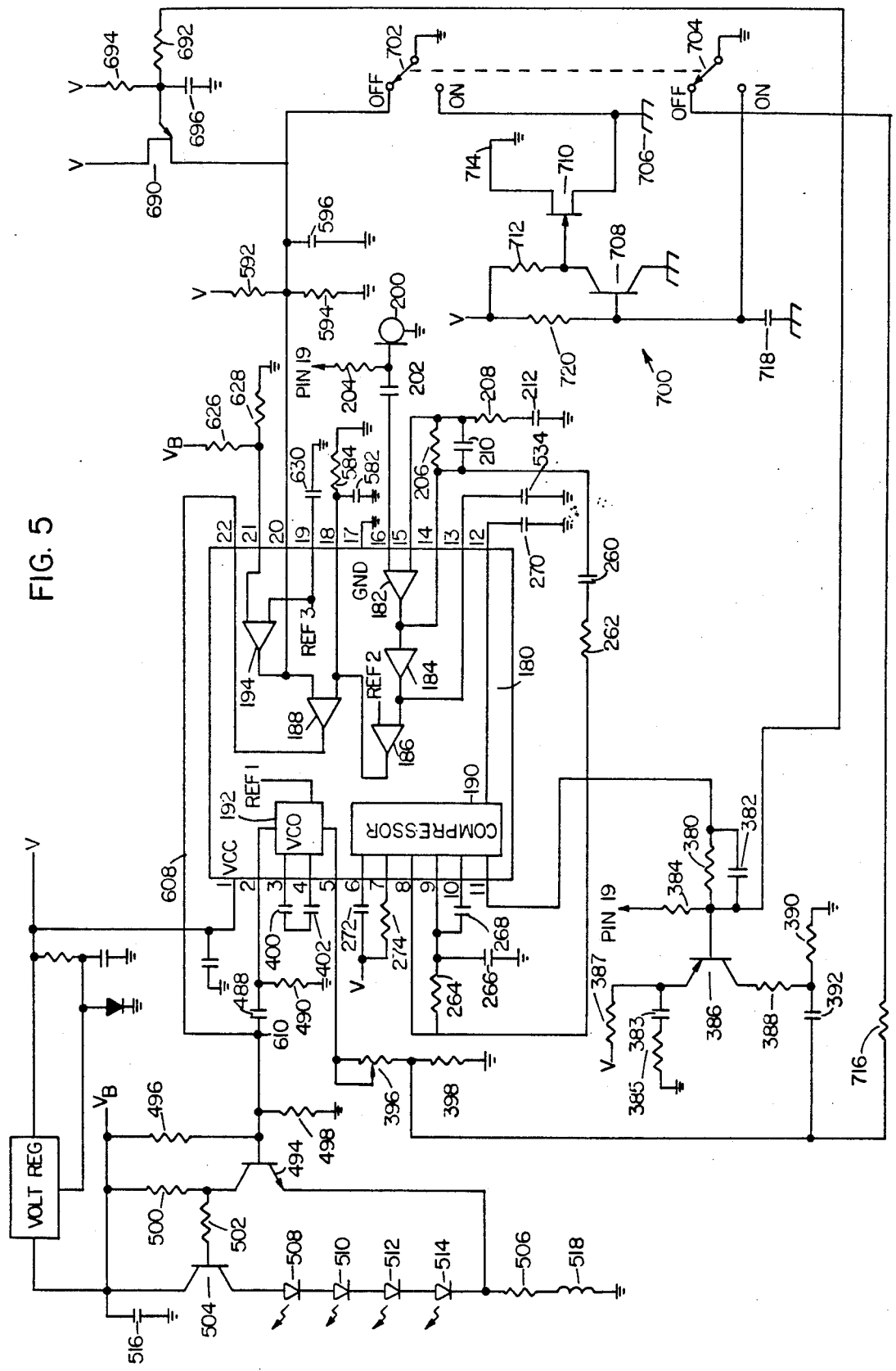
FIG. 5 is a schematic diagram of circuitry for implementing the remote microphone unit.

Referring now to FIG. 5, there is presented a detailed schematic diagram of the remote microphone unit diagrammed in FIG. 4. As will be noted, an integrated circuit 180 contains much of the remote microphone unit electronics. Specifically, IC 180 includes a microphone amplifier 182, peak detector 184 and comparators 186, 188. Also, a compressor stage 190 and a voltage controlled oscillator 192 are included in IC 180. Finally, a comparator 194 for the low battery detection circuit is included in IC 180. There are, of course, various internal reference sources in IC 180, including a band gap reference for VCO 192, a reference source for comparator 186, and a band gap reference for comparator 194. These references are indicated in FIG. 5 as Ref 1, Ref 2 and Ref 3, respectively. Each of the functional blocks indicated in FIG. 5 for IC 180 are detailed in the schematic diagrams of FIGS. 6–12, which are described herein.

An electret microphone 200 is coupled by capacitor 202 to pin 16 of IC 180. Additionally, a bias resistor 204 for microphone 200 is included. Pins 15 and 16 are the inverting and non-inverting inputs, respectively, to microphone amplifier 182. Feedback resistors 206 and 208 determine the closed loop gain of amplifier 182. The parallel combination of resistor 206 and capacitor 210 along with resistor 208 and capacitor 212 determine the 3 dB roll-off frequencies of the amplifier.

a. Microphone Amplifier

Figure 6:
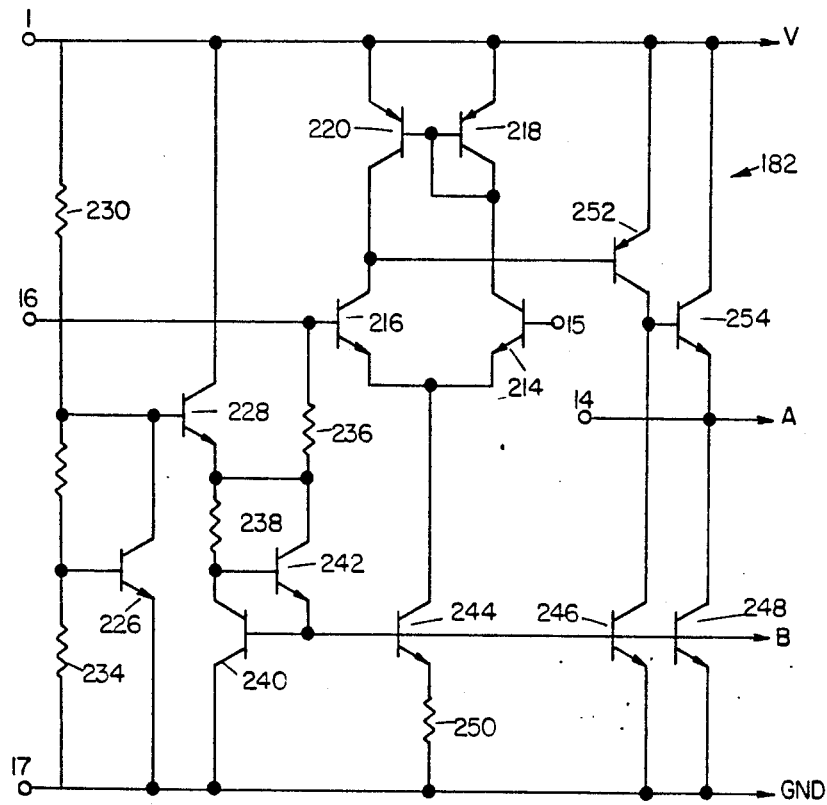
FIG. 6 is a schematic diagram of the circuitry of the microphone amplifier portion of the integrated circuit in the schematic of FIG. 5.

Referring to FIG. 6, there is presented a detailed schematic diagram of microphone amplifier 182. The microphone amplifier is a differential stage operating as a transconductance amplifier. That is, it produces an output current proportional to the input voltage. The input pins 15 and 16 are connected, respectively, to transistors 214, 216. Transistors 218, 220 form an active load for maximum gain. The differential stage is DC biased with a VBE multiplier comprising transistors 226, 228 and resistors 230, 232 and 236. The reference level is applied as bias through resistor 236 to the base of transistor 216. The reference level is also applied to a buffered current source comprising resistor 238 and transistors 240, 242 to produce a reference current that is applied to a string of current sources including those comprising transistors 244, 246 and 248. As shown, connected in series with transistor 244 is a resistor 250.

The output current of the differential stage is amplified by transistor 252 and buffered by transistor 254. The microphone amplifier output is made available externally of IC 180 at pin 14. Internally of the IC, the microphone amplifier output, Signal A, is made available to peak detector 184 shown in FIG. 7.

With reference to FIG. 5, the output of microphone amplifier 182 is coupled through capacitor 260 and resistor 262 to the input of compressor 190 which is at pin 8 of IC 180. The compressor is a non-inverting voltage amplifier. The input level to the amplifier is proportional to the product of the incoming signal and the impedance of a variable impedance circuit. The impedance of this circuit is inversely proportional to the square root of the input signal. Accordingly, for an input change in level of 20 dB, the output change is 10 dB. Thus, compressor 190 is a two-to-one compressor. The microphone amplifier output signal is also applied through resistor 262 and capacitor 260 to a network comprising resistor 264 and capacitor 266. Pin 9 of IC 180 connects to this network. Also, capacitor 268 is connected between pins 9 and 10 of the device. Additional components connected to IC 180 for compressor 190 include capacitor 270 connected to pin 12 and capacitor 272 and resistor 274 connected to pins 6 and 7, respectively. The output of compressor 190 is pin 11.

b. Compressor

Figure 10:
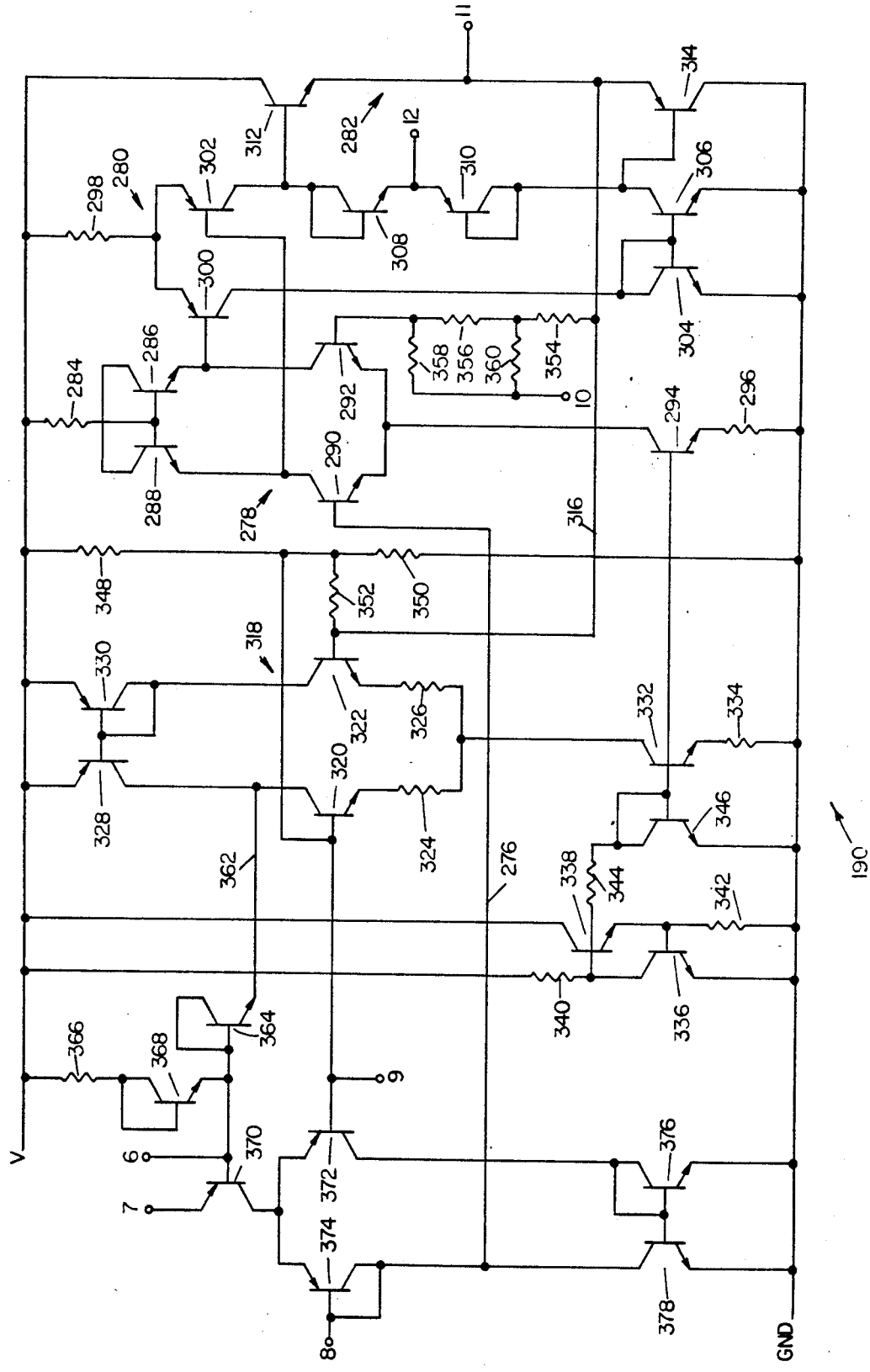
FIG. 10 is a schematic diagram of the circuitry of the compressor portion of the integrated circuit in the schematic of FIG. 5.

Referring to FIG. 10, a detailed schematic of the compressor portion of IC 180 is presented. The input signal applied to pin 8 of the IC is routed along line 276 to a voltage amplifier comprising a differential gain stage 278, a transistor amplifier stage 280, and a push-pull output stage 282.

The differential gain stage comprises resistor 284 and transistors 286, 288, 290 and 292. A current source comprising transistor 294 and resistor 296 is further included in gain stage 278.

The amplifier 280 includes resistor 298 and transistors 300, 302. Additionally, the collectors of transistors 300, 302 are connected to a current source comprising transistors 304, 306. Connected between the collectors of transistors 302 and 306 are emitter-coupled transistors 308, 310. The interconnection of the emitters of these two transistors defines pin 12 of IC 180 to which external capacitor 270 is connected.

The push-pull output stage 282 comprises transistors 312 and 314. The interconnection of the emitters of these two transistors defines pin 11, which is the output of compressor 190.

The output of the voltage amplifier is fed back over line 316 to another differential gain stage 318 which comprises transistors 320, 322 and resistors 324, 326. Further included are transistors 328, 330 and a current source including transistor 332 and resistor 334.

A reference level for the current sources of gain stages 278 and 318 is provided by a reference source comprising transistors 336, 338 and resistors 340, 342. The reference level is available at the base of transistor 338 and is applied to the current sources through resistor 344 and transistor 346.

Biasing for both gain stages 278 and 318 is provided by resistors 348, 350 and capacitor 266 shown in FIG. 5 to be connected to pin 9. The bias is made available through a resistor 352 connected to line 316. The biasing level on line 316 is applied to gain stage 278 by a network comprising resistors 354, 356, 358 and 360. Additionally, the junction of resistors 358 and 360 defines pin 10 of the IC device to which, as shown in FIG. 5, capacitor 268 is connected.

The output of gain stage 318 is at the collector of transistor 320 to which line 362 is connected. The output is half-wave rectified by transistor 364. The resulting signal is filtered by capacitor 272 connected, as shown in FIG. 5, to pin 6 of the IC device. A base line reference level is established for the half-wave rectified signal by resistor 366 and transistor 368.

A transistor 370 receives the rectified and filtered waveform. The emitter of transistor 370 defines pin 7 of the IC device. External resistor 274 shown in FIG. 5, therefore, connects to the emitter of transistor 370. Resistor 274 sets the crossover level for 2:1 compression. The collector of transistor 370 connects to a differential circuit including transistors 372, 374, 376 and 378.

The waveform at the base of transistor 370 determines the DC current through transistors 372, 374. Since the signal at the base of transistor 370 is derived from the input signal, the current through transistors 372, 374 is proportional to the amplitude of the AC input signal on pin 8. In the arrangement shown, the input impedance seen at the base of transistor 374 is inversely proportional to the output signal level at pin 11. The output signal level is, of course, directly proportional to the input signal level times the input impedance. Therefore, the output voltage is proportional to the square root of the input signal level; and thus, there is a 1 dB change in the output signal level for a 2 dB change in the input signal level.

Referring again to FIG. 5, the output of compressor 190 at pin 11 is applied to a pre-emphasis network comprising resistor 380, capacitor 382 and resistor 384. The output of the pre-emphasis network is applied to the base of transistor 386. This device is connected as a gain stage and provides isolation between the pre-emphasis network and the circuitry which follows. Resistor 390 is used to set the deviation of the FM modulator in the remote microphone unit. Resistor 388 in combination with resistor 390 forms a voltage divider network. The signal available at the junction of resistors 388 and 390 is AC coupled by capacitor 392 to the VCO.

An input network comprising potentiometer 396 and fixed resistor 398 interconnects pin 5 of IC 180 and capacitor 392. This network couples the signal to VCO 192 in IC 180. The output of VCO 192 is pin 2 of the integrated circuit. Pins 3 and 4 of the device are also interconnected with VCO 192 and have series capacitors 400 and 402 connected therebetween. Additionally, an internal band gap reference, Ref 1, connects to VCO 192.

c. Voltage Controlled Oscillator

Figure 11:
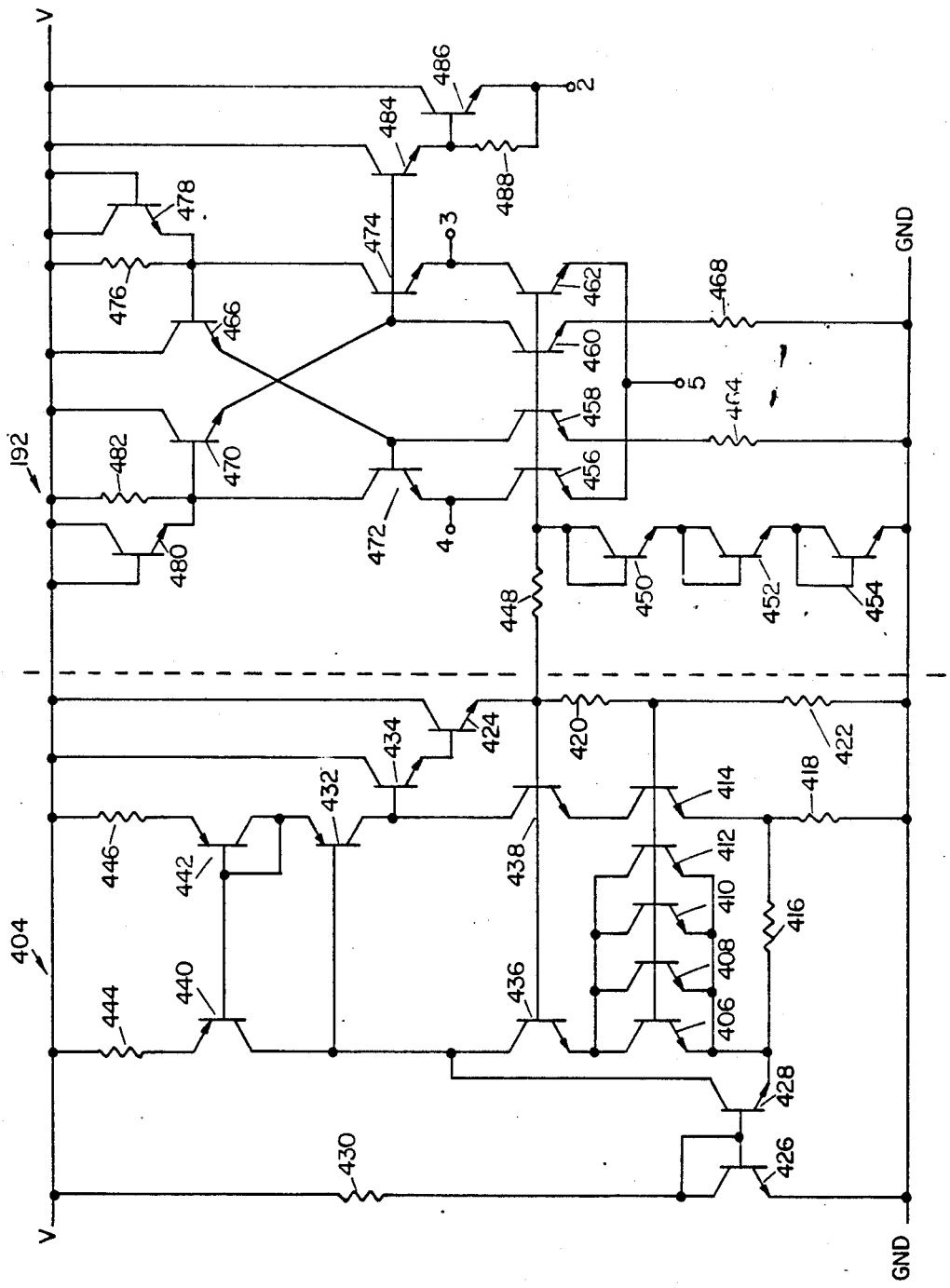
FIG. 11 is a schematic diagram of the circuitry of the VCO and VCO band gap reference portions of the integrated circuit in the schematic of FIG. 5.

Referring now to FIG. 11, there is presented in a detailed schematic diagram the circuitry for the VCO band gap reference and the VCO 192 portions of IC 180. The VCO is an emitter-coupled multivibrator. The center of frequency of the VCO is controlled by a reference voltage generated by the band gap reference, capacitors 400 and 402, and the combined resistance of resistors 396 and 398. Potentiometer 396 is used to tune the center of frequency of the VCO to 455 KHz.

The band gap reference circuit generally indicated by reference number 404 creates a stable voltage reference by comparing the base to emitter voltage drop of two different sized transistors. Transistors 406, 408, 410 and 412 are connected in parallel to simulate one transistor with an emitter area four times that of a single transistor. The larger emitter area reduces the current density to one-fourth that of a single transistor, which results in a different base to emitter voltage drop from that of a single transistor. The other transistor used in the comparison is transistor 414. The difference in base to emitter voltage drops for transistor 414 and the four parallel transistors creates a current through resistor 416. This current and the current through transistor 414 create a voltage drop across resistor 418. The voltage at the base of transistor 414 is, of course, the sum of the base to emitter voltage drop of transistor 414 and the voltage across resistor 418. This voltage is approximately 700 millivolts.

The base of transistor 414 is connected to the junction of resistors 420 and 422. The voltage at the base of transistor 414 is scaled up by a factor of $1+(R\ 420/R\ 422)$. Preferably, this scaling factor is on the order of four. Thus, the voltage at the emitter of transistor 424 is 2.8 volts.

A start-up circuit comprising transistors 426, 428 and resistor 430 provide base current for transistor 432. Base current drive to transistor 432 turns on transistors 434 and 424, which activates transistors 436 and 438. Activation of transistors 436 and 438 results in the activations of transistors 406 through 412 and transistor 414. Additionally included in the band gap reference circuit are transistors 440, 442 and resistors 444, 446.

The output reference level at the emitter of transistor 424 is independent of supply voltage and is used as a reference voltage for a diode reference circuit in VCO 192. This diode reference circuit includes resistor 448 and series-connected transistors 450, 452 and 454. The circuit connects to the base lead of each of transistors 456, 458, 460 and 462. Transistor 458 and resistor 464 act as a current source for transistor 466. Similarly, transistor 460 and resistor 468 act as a current source for transistor 470. Further, transistor 456 in combination with external resistors 396 and 398 connected to pin 5 forms a current source for transistor 472. Transistor 462 in combination with resistors 396 and 398 acts as a current source for transistor 474.

If it is assumed that transistor 472 is in cut-off and transistor 474 is conducting, current must flow from pin 3 to pin 4 through external capacitors 400 and 402, because the emitter of transistor 472 looks like an open circuit. This causes a current of twice that flowing between pins 3 and 4 to flow through transistor 474. If the current between pins 3 and 4 is large enough that the voltage drop across resistor 476 is sufficient to turn on transistor 478, the base of transistor 466 is one diode drop below the supplied voltage. The base of transistor 472 is then two diode drops below the supply voltage. The base of transistor 470 is essentially at the supply voltage, and its emitter is one diode drop below. The emitter of transistor 474 is two diode drop below the supply voltage.

Because transistor 472 is cut-off, the current flowing through the external capacitors connected to pins 3 and 4 is charging the capacitor so that pin 4 becomes more and more negative. When the voltage at pin 4 reaches the supply voltage minus three base to emitter voltage drops, transistor 472 becomes active and transistor 480 turns on. The voltage at the base of transistor 474 then becomes equal to the supply voltage minus two base to emitter voltage drops and transistor 474 goes into cut-off. The process repeats itself with current flowing from pin 4 to pin 3 until switching occurs. The circuit is symmetrical and the time required to charge the capacitor is half the period.

The square wave signal produced at the base of transistor 474 is modulated with the electrical voice signal applied to pin 5. The modulated sub-carrier square wave signals fed into a Darlington output stage comprising transistor 484, transistor 486 and resistor 488. The emitter of transistor 486 is connected to pin 2 of IC 180 where the modulated sub-carrier signal is made available.

Returning now to FIG. 5, resistor 490 shown connected to pin 2 of IC 180 provides the emitter resistor for the Darlington output stage transistor 486.

The modulated 455 KHz sub-carrier signal from VCO 192 is AC coupled through capacitor 488 and applied to the driver circuit for the infrared radiation source. Specifically, the sub-carrier signal is applied to the base of transistor 494. Resistors 496 and 498 provide biasing for transistor 494. A resistor 500 is connected to the collector of transistor 494 along with an input resistor 502 to the base of transistor 504. The emitter of transistor 494 further connects to a resistor 506. The infrared radiation source comprising four series-connected light-emitting diodes 508, 510, 512 and 514 interconnects between the collector of transistor 504 and resistor 506. An inductor 518 is connected from resistor 506 to ground.

Transistor 494 is biased to a quiescent point, thereby establishing a prescribed voltage across resistor 506 and inductor 518. This in turn establishes a prescribed current through the light-emitting diodes. When the AC sub-carrier signal is coupled through capacitor 488, the current through the light-emitting diodes is correspondingly varied, which effects AM modulation of the infrared radiation output of the light-emitting diodes. The inductor 518 acts as an integrator on the 455 KHz square wave producing a sawtooth waveform, which results in a higher efficiency transmission.

d. Peak Detector

Figure 7:
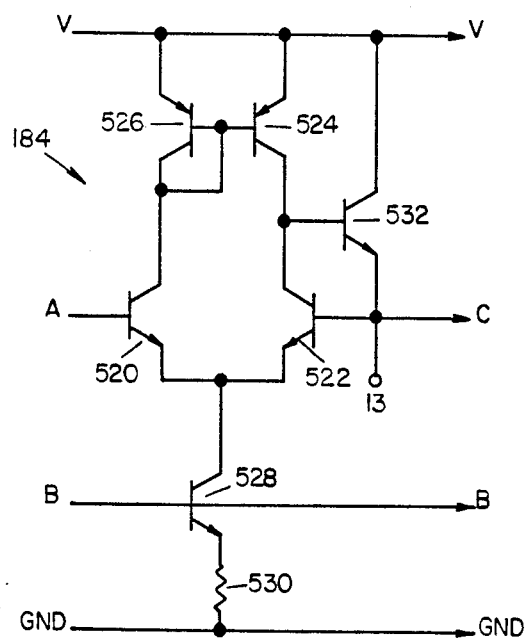
FIG. 7 is a schematic diagram of the circuitry of the peak detector portion of the integrated circuit in the schematic of FIG. 5.

Returning to the output of the microphone amplifier 182, the output signal therefrom is applied to peak detector 184. A detailed schematic diagram of the peak detector is presented in FIG. 7. In FIG. 7, it is indicated that the input, signal A, thereto is applied to a differential amplifier stage comprising transistors 520, 522, 524 and 526. Additionally, a current source including transistor 528 and resistor 530 is included. The signal to the base of transistor 528 is the reference level indicated as signal B in FIG. 6. Pin 13 of the IC device is defined at the interconnection of the base of transistor 522 and the emitter of transistor 532. As indicated in FIG. 5, a capacitor 534 is connected to pin 13. This capacitor is charged up to the positive peaks of the voice signal. The only discharge paths for capacitor 534 are the base lead of transistor 522 and comparator 186.

e. First Voice Switching Comparator

Figure 8:
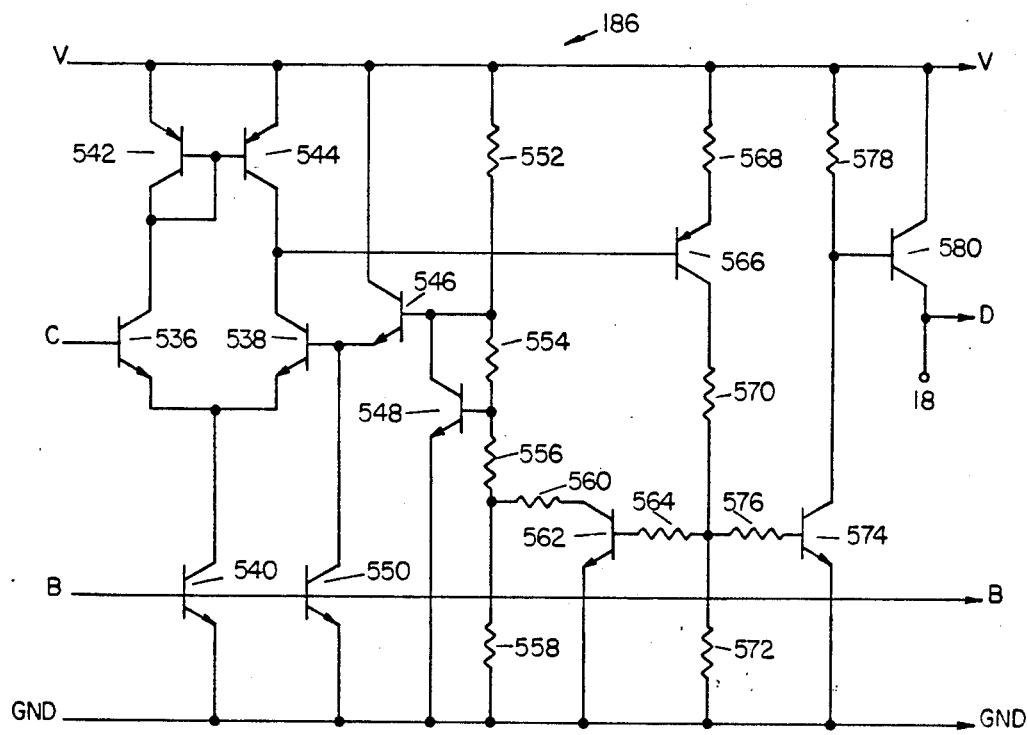
FIG. 8 is a schematic diagram of the circuitry of the first voice switch comparator portion of the integrated circuit in the schematic of FIG. 5.

A detailed schematic for the comparator 186 portion of IC 180 is presented in FIG. 8. With reference now to FIG. 8, the peak detector output signal C is applied to a circuit comprising transistor 536, 538, 540, 542 and 544. The reference voltage for the comparator is obtained from the internal reference, Ref 2, which comprises transistors 546, 548, 550 and resistors 552, 554, 556, 558, and 560.

Hysteresis is provided by the switching of transistor 562. Switching is controlled by a signal applied to the base of transistor 562 through resistor 564. The switching control signals are obtained from a circuit comprising transistor 566 and resistors 568, 570 and 572.

When transistor 562 is cut-off, the reference voltage equals the base emitter voltage drop of transistor 548 multiplied by a factor of [R 554/(R 556+R 558)]. When transistor 562 is saturated, the reference voltage equals the base emitter voltage drop multiplied by a factor of R 454/[R 556+(R 558 in parallel with R 560)]. The reference level generated at the emitter of transistor 546 is slightly greater (e.g., 150 millivolts) than the voltage at the base of transistor 536 when there is no input signal. When a signal is present and the comparator switches "high" the reference level is reduced, for example, by about 100 millivolts. Thus, the comparator input level must go below its original threshold level by that amount of hysteresis before the comparator will turn off. The switching of transistor 566 provides the hysteresis by controlling transistor 562 in switching resistor 560 in and out of a parallel combination with resistor 558.

Transistor 566 also controls transistor 574 by application of a switch control signal through base resistor 576. The collector of transistor 574, which is in series with resistor 578, provides a "high" output when an electrical voice signal is present, and provides a "low" output when an electrical voice signal is absent.

Transistor 580 is connected as an emitter follower to the collector of transistor 574 and provides a path for charging capacitor 582 which is connected to pin 18 of the integrated circuit device. Resistor 584 provides the discharge path.

The voltage at pin 18 rises quickly to its maximum level when an electrical voice signal is detected, but slowly decays to its minimum level when an electrical voice signal is absent. The output of comparator 186, designated as signal D, is provided as an input to comparator 188 shown in FIG. 9. When voice is present, the output signal D from comparator 186 is high, and it goes low when there is an absence of voice.

Comparator 188 is provided to establish prescribed timing for infrared radiation carrier turn-off following a cessation of user talking. As discussed in connection with the timing diagram of FIG. 3, it is preferred to hold the carrier on for a delay time $D_4$ after a cessation of user talking in order to permit the base station to detect that voice is absent in the infrared radiation carrier transmission. This is, of course, desired in order that the selector switch in the base station can be directed to present the local microphone electrical voice signal to the phone line prior to the loss of carrier, thereby preventing a squelch tail from being presented to the phone line. The use of two comparators in implementing the voice actuated carrier switching was found necessary in order to establish a desired delay time $D_4$ which is immune to battery voltage variation and user voice amplitude and frequency. The output of comparator 188 is made available at pin 22 of IC 180.

f. Second Voice Switch Comparator

Figure 9:
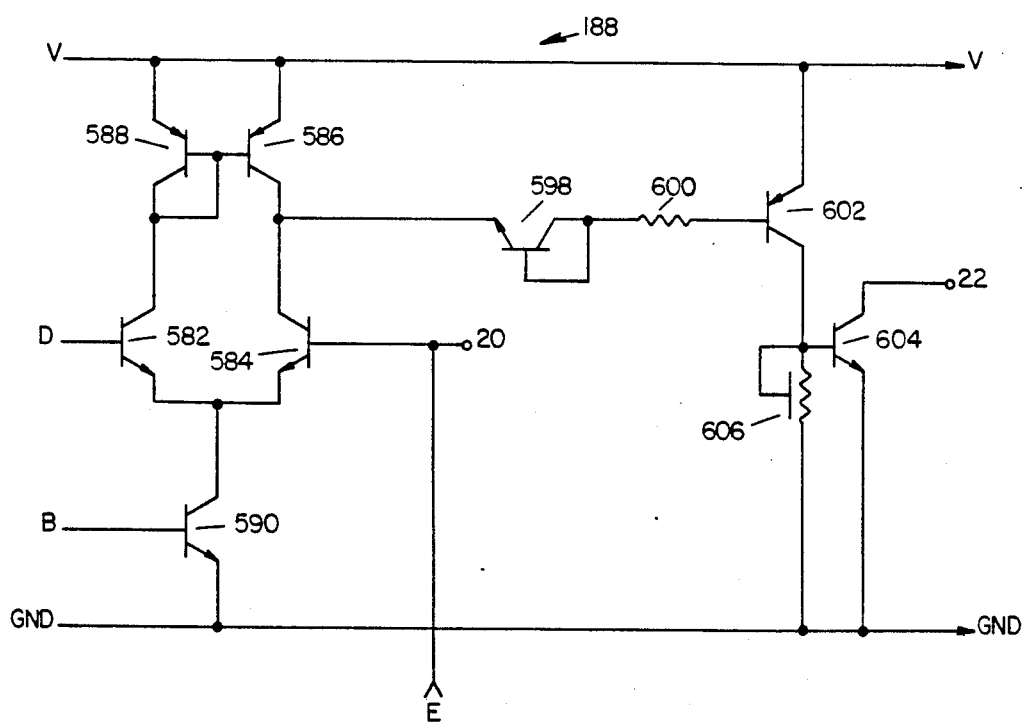
FIG. 9 is a schematic diagram of the circuitry of the second voice switch comparator portion of the integrated circuit in the schematic of FIG. 5.

Referring now to the detailed schematic diagram of comparator 188 shown in FIG. 9, the output signal D from comparator 186 is applied to a differential amplifier comprising transistors 582, 584, 586 and 588. Additionally, a current source implemented by transistor 590 is included. The reference level for the comparator is established at the base of transistor 584 by external resistors 592, 594 and external capacitor 596 connected to pin 20 of the integrated circuit device. The threshold level is established such that the comparator will rapidly turn on when voice is detected, but will turn off very slowly when voice disappears. Output circuitry for the comparator includes transistor 598 and an input resistor for transistor 602, which are connected to the collector of transistor 584. Additionally, a transistor 604 and a resistor 606 are included.

The collector of transistor 602 goes low when voice is present and forces transistor 604 into cut-off, which enables the infrared radiation source driver and produces carrier transmission. The collector of transistor 602 goes high when the input signal D decays below the threshold level. This places transistor 604 in saturation and essentially pulls pin 22 to ground.

Returning to FIG. 5, the output of comparator 188 available at pin 22 is applied over line 608 to the base of transistor 494.

When pin 22 is low, which occurs when voice is absent, the base of transistor 494 is drawn essentially to ground. This, of course, prevents current flow through the infrared light-emitting diodes. Also, the sub-carrier signal output of VCO 192 is immediately taken away as an input to the driver stage.

Continuing with reference to FIG. 5, in order to implement a low battery indication function, comparator 194 is included in IC 180. Also included within IC 180 is a band gap reference, Ref 3, for comparator 194. The battery voltage input to comparator 194 is provided by a voltage divider comprising resistors 626, 628 connected to pin 21 of IC 180. The other input to comparator 194, to which Ref 3 is connected, is available at pin 19 of the integrated circuit. An external filter capacitor 630 is connected to pin 19.

g. Low Battery Comparator

Figure 12:
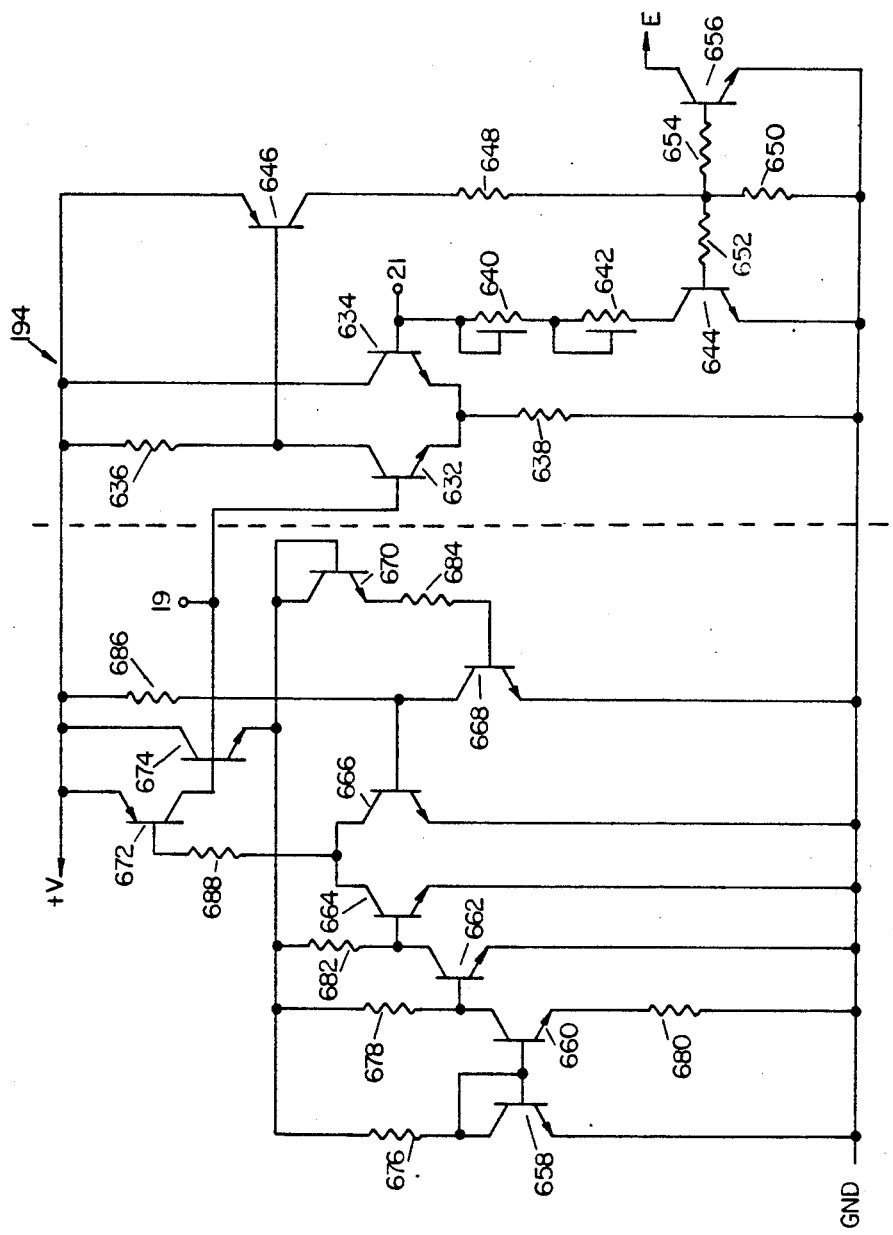
FIG. 12 is a schematic diagram of the circuitry of the low battery comparator and band gap reference portions of the integrated circuit in the schematic of FIG. 5.

Referring now to FIG. 12, there is presented a detailed schematic diagram of circuitry within the integrated circuit for implementing the reference source, Ref 3, and comparator 194. The comparator portion comprises transistors 632 and 634. A resistor 636 is connected in series with the collector of transistor 632. The emitters of transistors 632 and 634 are connected together and have resistor 638 in series therewith. The base of transistor 634 defines pin 21 of IC 180 to which external voltage divider resistors 626, 628 are connected. Additionally, connected to the base of transistor 634 is a series circuit comprising resistors 640, 642 and transistor 644. Transistor 644 switches resistors 640, 642 in and out of a parallel combination configuration with external resistor 628 to provide hysteresis. Switching control of transistor 644 is provided by the circuitry comprising transistor 646 and resistors 648, 650 and 652. Base drive to transistor 646 is obtained from the collector of transistor 632. The switching control signal is also applied through resistor 654 to transistor 656. This transistor constitutes the output stage of the comparator, and its collector collects to the base of transistor 584 in FIG. 9, which is an input to comparator 188.

The reference level to comparator 194 is produced by a band gap reference circuit comprising transistors 658, 660, 662, 664, 666, 668, 670, 672 and 674. The reference level for comparator 194 is established on the collector of transistor 672. In addition to being connected to pin 19 and transistor 632 of comparator 194, the collector of transistor 672 is also connected to the base of transistor 674. This establishes an operating voltage for the circuits which connect to the base leads of transistors 664 and 666. In the circuit that establishes an operating voltage on transistor 664, transistor 658 and resistor 676 bias transistor 660. A collector resistor 678 and an emitter resistor 680 are provided. The voltage established at the base of transistor 662 sets its operating point. The voltage on the collector of transistor 662 is applied to the base of transistor 664. A collector resistor 682 is also provided.

The circuit connected to the base of transistor 666 has transistor 670 and resistor 684 biasing transistor 668. The collector lead of transistor 668 connects through resistor 686 to electrical power V.

The collectors of transistors 664 and 666 connect through resistor 688 to the base of transistor 672. The reference voltage level established is on the order of 2.6 volts.

When the battery voltage becomes sufficiently low that the voltage on pin 21 of IC 180 falls below the reference level established at pin 19, the open collector output of comparator 194 pulls the inverting input of comparator 188 to ground. This establishes the output of the comparator 188 in a high condition at all times, thereby leaving the infrared radiation source driver stage enabled to transmit the carrier.

Also connected to pin 20 of IC 180 is a keyed oscillator circuit comprising unijunction transistor 690 and a frequency-determining network of resistor 694 and capacitor 696. The oscillator is keyed on when pin 20 goes low. The sawtooth wave produced by the oscillator is coupled with VCO 192 through transistor 386. Resistor 692 provides the signal to the base transistor 386.

h. Hookswitch Control Circuit

Returning to FIG. 5, there is further diagrammed a circuit 700 for implementing the hook switch control function. The circuit includes a double-pole, double-throw switch having contact sets 702 and 704. The switch is shown in "off" position which corresponds to a telephone on-hook condition. Switch blade contact of each set of switch contacts is connected to circuit ground.

When it is desired to go off-hook to answer an incoming telephone call, the switch on the remote unit is actuated to the "on" position. In this position, circuit ground is connected to battery ground 706. The base of transistor 708 is also grounded placing the device in the cut-off state. The gate of FET 710 is connected to the power supply through resistor 712, which establishes a short circuit between the drain and source, thereby connecting battery ground to circuit ground connection 714. Accordingly, power is supplied to the circuitry of FIG. 5.

Additionally, since some indication to the base station is required to go off-hook, it is necessary to momentarily enable the infrared radiation source to transmit a carrier to the base station. This is accomplished by allowing the voltage on the pin 20 input to comparator 188 to rise slowly, such that the output of the comparator goes high for a brief period of time. The slowly rising voltage on pin 20 is created by the requirement to charge capacitor 596 in reaching the threshold voltage established by resistors 592 and 594. When capacitor 596 has charged to the prescribed threshold level, the output of comparator 188 goes low and disables the infrared radiation source driver stage.

At the conclusion of a telephone conference, when it is desired to go back on-hook, the on-off switch for the remote unit is actuated to the "off" position. This grounds pin 20 of the IC and causes the output of comparator 188 to go high, enabling the infrared radiation source driver stage. At the same time, resistor 716 is placed in parallel with resistor 398, thereby changing the resistance of the network connected to pin 5 of IC 180. Since this network establishes the center frequency of the sub-carrier signal produced by VCO 192, placing resistor 716 in parallel with resistor 398 causes a shift of the center frequency. This shift in frequency is up to a higher frequency. Suitably, the shift is on the order of 10 KHz.

Simultaneously with the transmission of a shifted sub-carrier signal, capacitor 718 is being charged through resistor 720. When capacitor 718 is charged to a level sufficient to turn on transistor 708, the gate to FET 710 is grounded and the short circuit path therethrough between battery ground and circuit ground is interrupted. This, of course, removes power from the remote microphone unit circuitry.

It is to be understood that following actuation of the control switch from the "on" position to the "off" position, circuit 700 maintains power to the unit for a period of time during which the sub-carrier of the VCO is shifted up and transmitted via the infrared radiation carrier to the base station. There, the shift in sub-carrier frequency is detected as an indication to go back on-hook.

The integrated circuit 180 is preferably a semi-custom device comprising an XR-C580A device manufactured by Exar Integrated Systems, Inc., 750 Palamar Avenue, Sunnyville, Calif. 94088. The Exar device comprises a plurality of transistor elements which may be interconnected in a desired fashion by a custom mask. The schematic diagrams presented in FIGS. 6–12 detail the manner in which the Exar device transistor elements can be interconnected to form circuits implementing the functions diagrammed within integrated circuit 180 shown in FIG. 5.

D. Base Station

1. Detailed Block Diagram

Figure 13:
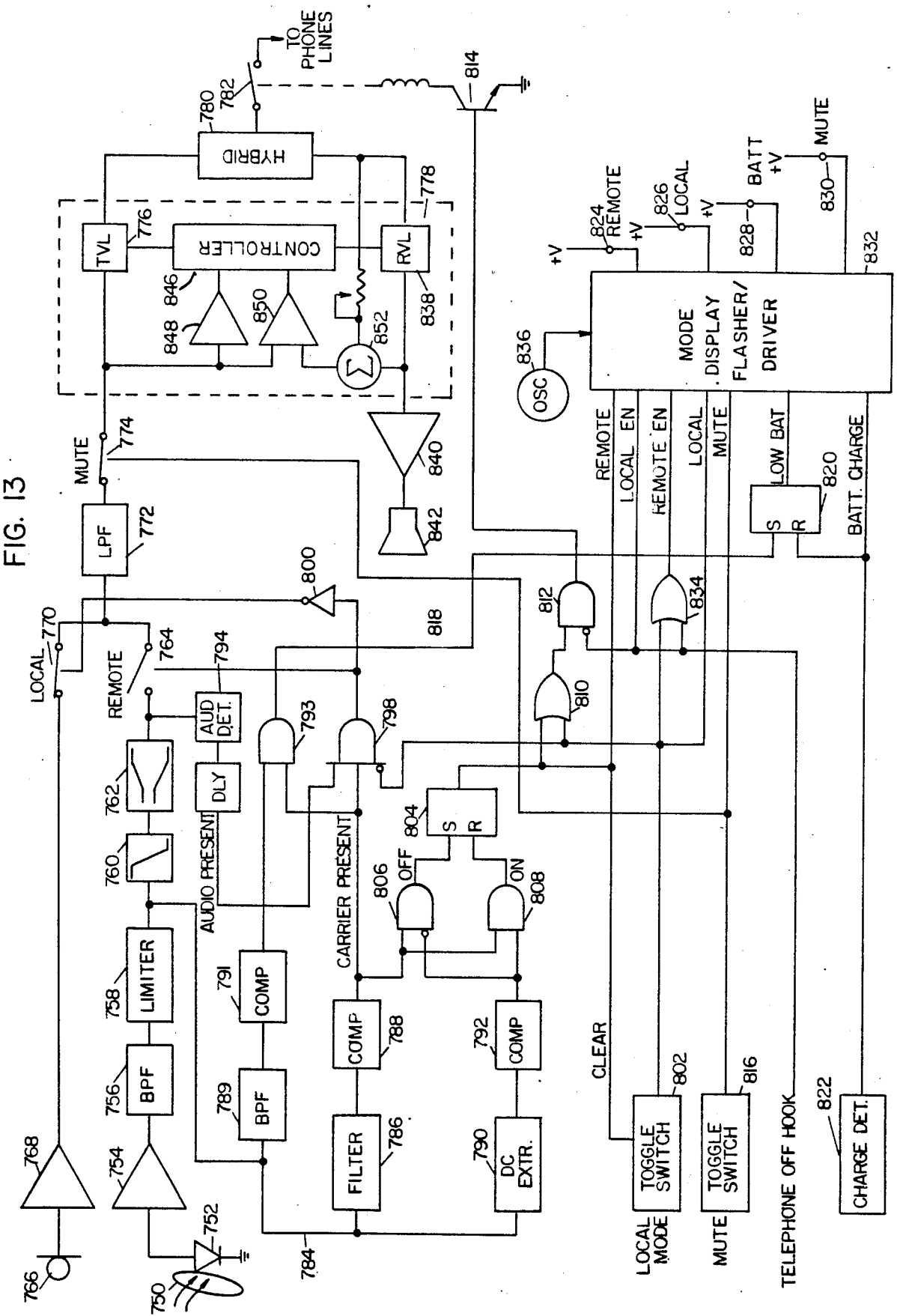
FIG. 13 is a detailed functional block diagram of the base station unit.

In FIG. 13, the diffuse infrared radiation of a carrier transmission from the remote microphone unit is concentrated by a lens 750 onto an infrared radiation detector 752. Since detector 752 serves as an AM demodulator, the resulting electrical signal is a reproduction of the sub-carrier signal produced in the remote microphone unit. This reproduced signal is applied to a preamplifier 754 with the resulting signal being applied to a band pass filter 756. A limiter/discriminator 758 demodulates the reproduced sub-carrier signal, producing a remote microphone electrical voice signal.

The recovered electrical voice signal is routed over two separate signal paths. One path leads to de-emphasis circuit 760 and on to expander 762. The expanded electrical voice signal is routed to a normally open switch 764.

A microphone transducer 766, which is preferably, though not necessarily, housed in the base station, picks-up ambient or background room noise and produces a representative electrical signal. This signal will be referred to as a local microphone electrical voice signal. The local microphone signal is applied to microphone amplifier 768 and made available to a normally closed switch 770. Switches 764 and 770 are commonly connected and oppositely controlled. That is, the two switches are controlled by oppositely-phased signals, such that when one switch is closed the other switch is open.

The microphone electrical voice signal, whether it be local or remote, as chosen by the state of switches 764 and 770, is applied to low pass filter 772 and routed through a normally closed switch 774, which serves as a mute switch. The signal conducted through switch 774 is applied to the transmit portion 776 of variolosser circuitry 778. A hybrid circuit 780 couples the variolosser circuit through the normally open hook switch 782 to the telephone lines.

The second signal path for the remote microphone electrical voice signal is over line 784. This signal path is again divided so as to supply the limiter/discriminator output to carrier present and sub-carrier shift detection circuits. The signal is also applied from line 784 to low battery detection circuitry.

To detect the presence of a carrier, the remote microphone electrical voice signal produced by the limiter/discriminator is applied to a band pass filter 786 and a level detection circuit 788. As the signal-to-noise ratio at the input to limiter/discriminator 758 decreases, there is a corresponding decrease in the signal-to-noise ratio at the output. Attendant this condition is an increase in noise on line 784. Accordingly, the technique adopted in this embodiment of the invention for determining the presence of an infrared radiation carrier transmission is to monitor the noise at the output of limiter/discriminator 758.

In this regard, filter 786 isolates a band of frequencies substantially above the audio frequency band. The output signal from filter 786 is evaluated to determine the noise power within the filter bandwidth. This is done by comparator 788. When the signal-to-noise ratio at the input of limiter/discriminator 758 is high, as would be the case when there is an infrared radiation carrier transmission from the remote microphone unit, there will be little power within the band of frequencies of filter 786. Accordingly, comparator 788 will produce a logic signal indicative of a Carrier Present condition. When, however, the signal-to-noise ratio gets low, as would be the case when there is no infrared radiation carrier transmission, there will be significantly more power within the band of frequencies passed by filter 786, and comparator 788 will produce a logic signal indicative of a carrier absent condition.

To detect a shift in the frequency of the sub-carrier signal, a DC extraction circuit 790 and a level shift detector 792 are utilized. The technique for a sub-carrier shift detection involves monitoring the limiter/discriminator 758 output for a change in its DC level. There will be a change only if the center frequency of the sub-carrier shifts. When there is a shift in the sub-carrier frequency, comparator 792 produces a logic signal indicative thereof. A shift in the sub-carrier frequency occurs, as previously described, when it is desired to go back on-hook and the control switch for the remote microphone unit is actuated to the "off" position.

To detect the transmission of a low battery condition in the remote microphone unit, the limiter/discriminator output is applied to a band pass filter 789 tuned to pass the 8 KHz signal imposed on the remote microphone electrical voice signal, but not voice frequency signals. The output of filter 789 is applied to a level detection circuit 791. The output of circuit 791 is applied along with the Carrier Present signal to AND logic 793, to produce a signal that sets latch 820. Latch 820 is reset by a signal from battery charger 822.

The recovered remote microphone electrical voice signal after de-emphasis and expanding is also applied to an audio detector 794. When an audio frequency signal, such as voice, is present at the expander output, the audio detector will produce an indication of that condition. The output response of the audio detector is delayed through delay circuit 796. As noted in the discussion in connection with FIG. 3, the delay in the audio frequency detector after a loss of audio is preferably on the order of 200 milliseconds. The delayed audio detector output signal is used as the Audio Present indication.

Control of switches 764 and 770 is by a signal generated from AND logic circuit 798. Its output is applied directly to switch 764 and inverted by inverter 800 for application to switch 770. The Carrier Present indication and the Audio Present indication signals are applied to logic 798 to derive the switch control signal. A third input to logic 798 is from a toggle switch 802 which controls whether or not the base station is in the local mode. The local mode toggle switch 802 provides an override to open switch 764 and close switch 770, such that only local microphone electrical voice signals are made available to the telephone lines.

The local mode toggle switch is cleared by a signal from set-reset latch 804. The set input to the latch is provided by AND logic 806, whereas the reset input to the latch is provided by AND logic 808. Both logic 806 and logic 808 receive the Carrier Present indication and the sub-carrier shift detection signals. Logic 806 provides a signal to the set input of latch 804 when there is a Carrier Present indication, but not a sub-carrier shift detection. This causes a signal to be applied to toggle switch 802 clearing it from the local mode.

When there is a Carrier Present indication accompanied by a sub-carrier shift detection, latch 804 is reset and toggle switch 802 is no longer held clear of the local mode.

The output of latch 804 is also applied as one input to OR logic 806. The other input is the output of toggle switch 802. The output of OR logic 810 is applied as an input to AND logic 812. The second input to logic 812 is a telephone off-hook indication from circuits within the telephone set itself. The output of logic 812 is utilized as the control signal for the hook switch relay driver 814.

If the telephone handset is not off-hook and logic 810 provides an indication that either the speakerphone apparatus is in the local mode or that there is a carrier present without an attendant sub-carrier shift, logic 812 provides a control signal to hook switch relay driver 814 to effect closure of hook switch 782.

A mute toggle switch 816 is included to provide a control signal to mute switch 774. Mute switch 816 is manually operated and by successive depressions serves to open and close the path for microphone electrical voice signals to the variolosser circuit.

In order to indicate to the user the operational state, or mode, of the speakerphone apparatus, visual indicators 824, 826, 828 and 830 are provided. These visual indicators, for example, light-emitting diodes, indicate whether the speakerphone apparatus is in the remote, local or mute mode. Additionally, an indication of the battery condition is given. A mode display flasher/driver accepts inputs from various circuitry in the base station and provides control signals for the visual indicators. Specifically, the mode display circuitry 832 receives a remote indication signal from latch 804 and a remote enable signal from OR logic 834. When an infrared radiation carrier transmission from the remote microphone unit is being received, as is indicated by the output of latch 804, the remote signal is provided, and the remote indicator 824 is continuously on. If, however, the unit should be placed in the local mode by actuation of toggle switch 802 or the telephone handset is picked-up, which produces the telephone off-hook signal, then a remote enable signal is input to the mode display. This results in the remote indicator 824 flashing on and off, indicating that the remote unit is working but it is overridden by use of either the telephone handset or the local microphone.

If toggle switch 802 has been actuated to place the speakerphone apparatus in the local mode, the local signal input to mode display 832 will cause local indicator 826 to be continuously on. If, however, the telephone handset is off-hook, producing a local enable signal to the mode display, the local indicator 826 will flash on and off.

Another signal input to mode display 832 is the mute signal from toggle switch 816. When the signal path to the variolosser circuit is muted, by the opening of switch 774, the mute signal is applied to mode display 832 causing the mute indicator 830 to be on.

Finally, the low battery and battery charge signals are applied to the mode display circuit. The low battery signal from latch 820 results in the mode display circuitry causing battery indicator 828 to flash on and off. The battery indicator is extinguished upon the appearance of a battery charging signal from charge detector 822, as would be produced when the remote microphone unit is placed in the cradle of the base station and the battery is charged.

In order to produce flashing of the visual indicators, it is necessary to provide a low frequency signal to the mode display circuit. Accordingly, oscillator 836 is included. Preferably, oscillator 836 provides a 2 Hz square wave.

Electrical voice signals coming in to the speakerphone base station over the telephone lines are routed through the receiver portion 838 of the variolosser circuit 778 and applied to an amplifier 840. The amplified electrical voice signals are then applied to a speaker 842 to produce acoustic voice signals. Because of the potential for undesired coupling between the base station speaker and the local and remote microphones, the speakerphone cannot be operated full duplex. Accordingly, as with virtually all speakerphones, full duplex operation is approximated by incorporating voice controlled switching between two variable loss circuits, one provided for the microphone electrical voice signal and one provided for the incoming electrical voice signal. The transmit and receive variable loss circuits 776, 838 are controlled by controller 846 to provide a constant loop gain, while switching from one to the other.

Inputs to the controller are from comparators 848 and 850. Comparator 848 may be referred to as a noise/voice comparator, and comparator 850 may be referred to as a line/microphone comparator. The line/microphone comparator compares the level of the microphone electrical voice signals to the level of incoming electrical voice signals. Noise/voice comparator 848 is provided to make a determination as to whether the microphone electrical voice signal passed through switch 774 is noise or voice.

Based on the outputs of the comparators, controller 846 provides control signals to the transmit and receive variable loss circuits. Control is based essentially on logic determinations.

If the microphone electrical voice signal is of a greater amplitude than the incoming electrical voice signal, and voice rather than noise is present, then the controller directs the transmit variable loss circuit 776 to increase gain and the receive variable loss circuit 838 to reduce gain.

If comparator 848 is indicating that the microphone electrical voice signal is indeed voice, but comparator 850 is indicating that the incoming electrical voice signal is louder than the microphone electrical voice signal, then controller 846 directs the variolosser circuit into the receive mode by increasing gain in the receive variable loss circuit and reducing gain in the transmit variable loss circuit.

If the microphone electrical voice signal comprises noise, and comparator 850 indicates that the microphone electrical voice signal is louder than the incoming electrical voice signal, the variolosser circuit assumes the receive mode. In this situation, neither the speakerphone user or the distant party is talking; however, the standby mode for the variolosser circuit is the receive mode.

The final possibility is that the microphone electrical voice signal would comprise noise and that the incoming electrical voice signal is louder than the noise. In that situation, the controller directs the variable loss circuits so as to place the variolosser in the receive mode.

The variolosser circuit 778 further includes a summing circuit 852. This circuit receives two signals from the incoming electrical voice signal receive path. The two signals are combined in the summer circuit with one signal being weighted over the other in forming a composite signal that constitutes the receive incoming electrical voice signal applied to comparator 850. The combining of incoming electrical voice signals present at both the input and output of the receive variable loss circuit is done because of the large loss through the receive variable loss circuit when the variolosser circuit is in the transmit mode. The very large loss would virtually preclude any incoming electrical voice signal from overcoming in comparator 850 the microphone electrical voice signal; and thus prevent the variable loss circuit 778 from changing from the transmit to the receive mode.

2. IR Detector and Pre-Amp Circuits

Figure 14:
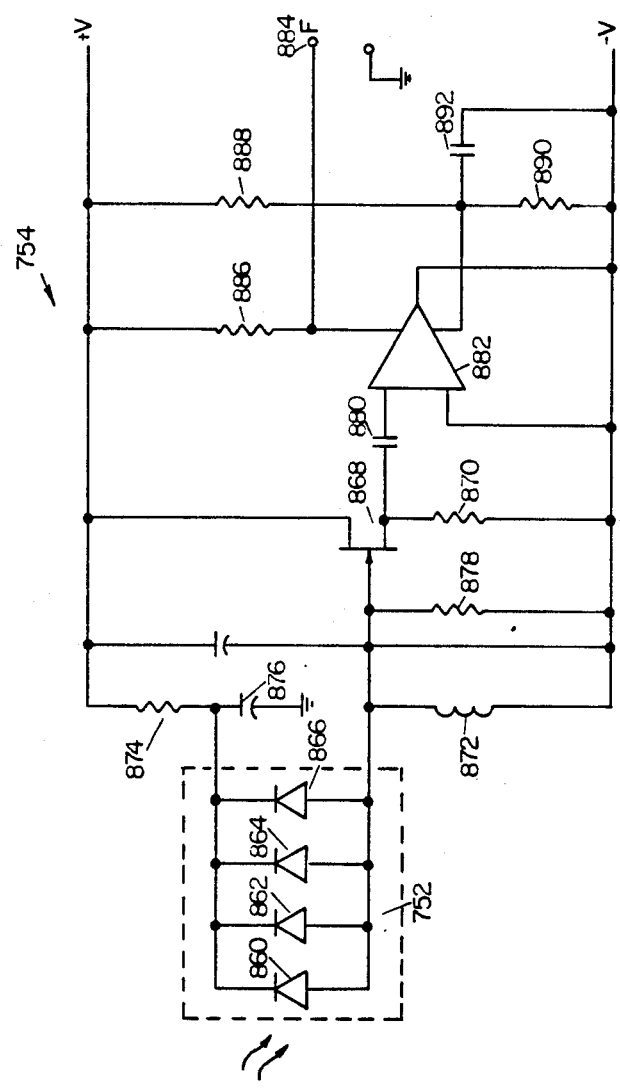
FIG. 14 is a schematic diagram of the photodetector pre-amplifier.

Referring to FIG. 14, the infrared radiation detector 752 is shown to comprise four parallel-connected infrared responsive photodiodes individually referenced as 860, 862, 864 and 866. There is a linear relation between the infrared radiation power that is incident upon the photodiodes and the electrical current produced. Because the photodiodes act as AM demodulators, the signal produced by the photodetectors corresponds to the sub-carrier signal in the remote microphone unit.

The electrical signal produced by the photodiodes is applied to the gate of FET 868. The drain is connected to +V and the source is connected through resistor 870 to −V. FET 868 is used as a source follower. The preamplifier is tuned to a center frequency corresponding to that of the sub-carrier by the combination of inductor 872 and the parasitic capacitance of the photodiodes. A current limiting resistor 874 is placed in series with the photodiodes and a filter capacitor 876 is also provided. A resistor 878 is connected between the source of FET 868 and −V to establish the input impedance of the preamplifier.

The buffered reproduced sub-carrier signal is coupled through capacitor 880 to a low noise gain stage comprising operational amplifier circuit 882. The output of the amplifier circuit is available at terminals 884 as signal F. The open collector output of amplifier 882 is connected to +V through resistor 886. Additionally, resistors 888, 890 establish a voltage on the automatic gain control input to amplifier 882.

3. Voice Signal Recovery, Carrier Present Detection, Voice Present Detection, and Sub-Carrier Shift Detection Circuits Referring to FIG. 15, the preamplifier output, signal F at terminals 884, is applied to ceramic filter 900 which is a band pass filter having a center frequency at 455 KHz, the frequency of the sub-carrier signal. The filter output is applied to an FM detector 902 having a limiter and a discriminator in a single integrated circuit package. The output of filter 900 is applied to the limiter inputs which are pins 5 and 6 of device 902. Termination resistor 904 provides impedance matching with output resistor 886 in the preamplifier. Capacitor 906 connects between node 908 and pin 6, and capacitor 910 connects between node 908 and +V. The limiter output is at pin 7. A resistor 910 interconnects pin 7 with node 908.

The limiter output is coupled through capacitor 914 to the discriminator input at pin 8 of device 902. The discrimination frequency is set by an RLC network comprising variable inductance coil 916, capacitor 918 and resistor 920. The remote microphone electrical voice signal which is recovered is partially filtered and buffered internally and made available at pin 9 of device 902.

The recovered remote microphone electrical voice signal is applied to a de-emphasis network comprising capacitor 922, resistor 924 and capacitor 926. The de-emphasis network is followed by an attenuator comprising resistors 928 and 930. The electrical voice signal is coupled through capacitor 932 to an expander circuit comprising device 934 and associated components including capacitors 936, 938, 940 and resistor 942. The output of the expander is at pin 2 and available there is the signal processed version of the remote microphone electrical voice signal.

Figure 16:
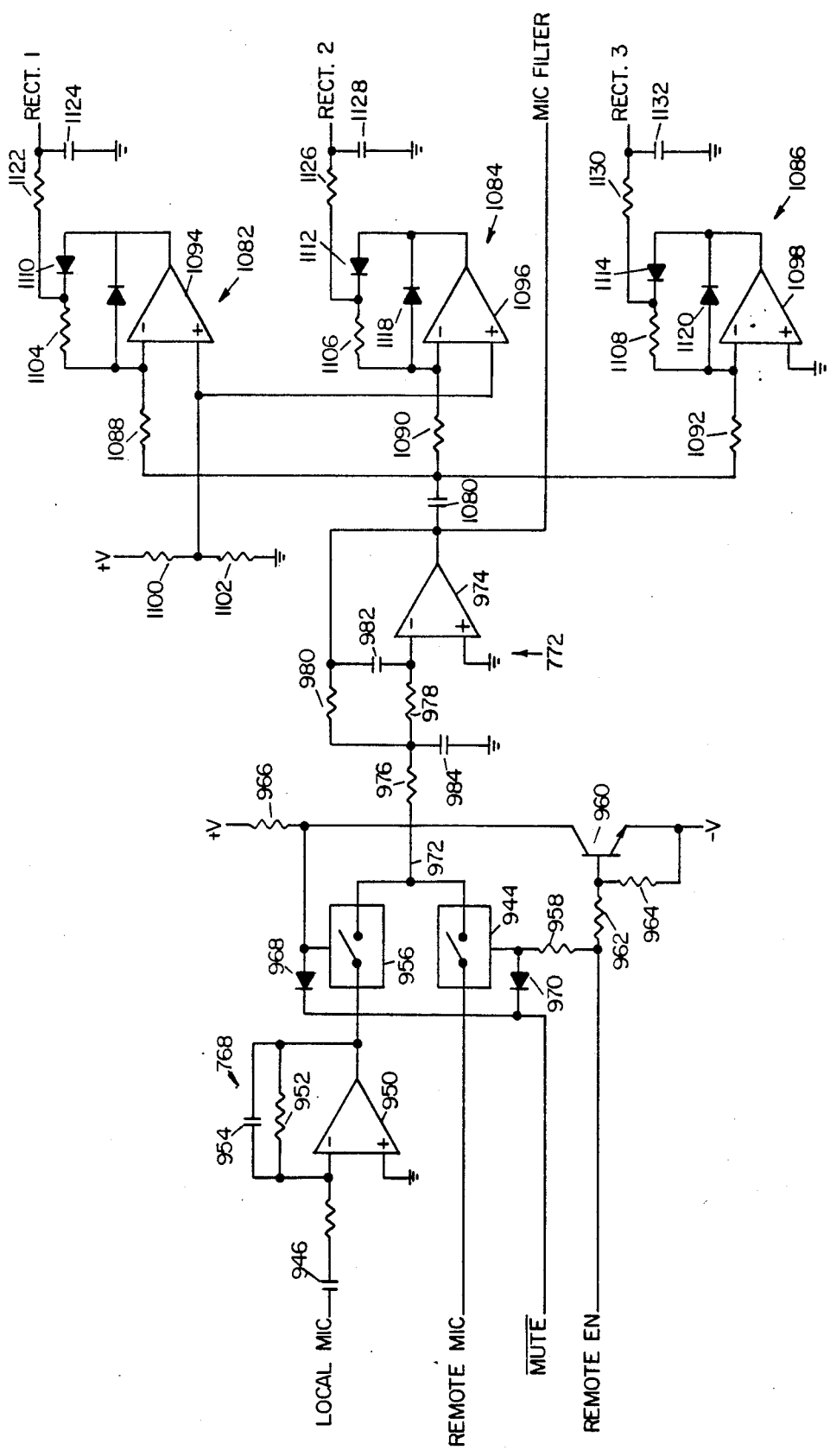
FIG. 16 is a schematic diagram of the local microphone pre-amplifier, the local/remote microphone electrical voice signal selection switches, and the microphone low pass filter.

The output of the expander goes to electronic switch 944 in FIG. 16. Also shown in FIG. 16 is local microphone amplifier 768. In that circuit, the local microphone electrical voice signal is coupled through capacitor 946 to an input resistor 948 connected to the inverting input of operational amplifier 950. A feedback network of resistor 952 and capacitor 954 establish the gain and frequency response characteristics of the amplifier. The amplified local microphone electrical voice signal is applied to another electronic switch 956.

Control of the state, either open or closed, of switches 944 and 956 is by means of the Remote Enable signal and the Mute signal. The Remote Enable signal is applied through resistor 958 to switch 944. The Remote Enable signal is inverted in the circuit comprising transistor 960 and resistors 962, 964 and 966. The inverted Remote Enable signal available at the collector of transistor 960 is applied as the control signal to switch 956. Thus, under the direction of the Remote Enable signal, one of the switches will be opened and the other closed. Specifically, when the Remote Enable signal is high switch 944 is closed and switch 956 is open. The switches assume the opposite state when Remote Enable is low.

Both switches 944 and 956 are simultaneously open when the $\overline{\text{Mute}}$ signal is low. This operation is provided by connecting diodes 968 and 970 to the switch control inputs as shown. When the $\overline{\text{Mute}}$ signal is high, it has no effect on the state of switches 944 and 956, and control is by the Remote Enable signal.

Switches 944 and 956 are commonly connected at node 972. Thus, whichever microphone electrical voice signal is selected is applied to filter circuit 772. The filter circuit includes operational amplifier 974 and the associated response determining components. These components include resistors 976, 978, 980 and capacitors 982, 984. The output of filter 772 is then applied to the variolosser circuitry, various portions of which are diagrammed in the remainder of FIG. 16 and in FIGS. 17 and 18. However, prior to discussing the variolosser circuitry, attention is directed back to FIG. 15 for a discussion of the various detectors used in the base station.

The audio frequency output signal at pin 9 of device 902 is also applied over line 1000 to filter 786 and carrier present detector 788. The signal is coupled by capacitor 1002 to a transistor circuit including transistor 1004 and a tuned network comprising inductor 1006 and capacitor 1008. The circuit further includes biasing resistors 1010 and 1012. The RC network comprising resistor 1014 and 1016 is connected between the emitter and −V.

The filtered signal is available from the collector of transistor 1004 and is applied to the inverting input of operational amplifier 1018 through resistor 1020. The non-inverting input of op-amp 1018 is provided with a threshold reference level by reason of a voltage divider network connected thereto comprising resistors 1022 and 1024. The inclusion of diodes 1026, 1028 forms an active rectifier circuit. The rectified signal is available from the point of connection of diode 1028 and resistor 1030. At the output of the rectifier circuit is a filter network comprising resistor 1032 and capacitor 1034.

The rectified signal is applied to a comparator circuit comprising operational amplifier 1036 and resistors 1038 and 1040. This comparator circuit provides the Carrier Present signal.

The filter circuit 786 is tuned for a center frequency of 100 KHz and a band width of 11 KHz. When an infrared radiation carrier is being transmitted, the power in the frequency spectrum above 20 KHz will be extremely small. When, however, there is an absence of an infrared radiation carrier, the output of the FM detector is noise, much of which is in the frequencies substantially above the audio frequency range. Thus, by looking at the power in the 11 KHz band centered around 100 KHz, the presence or absence of an infrared radiation carrier can be detected.

The filtered signal containing the frequencies in the 11 KHz band around 100 KHz is rectified by the rectifier circuit to produce a DC level indicative of the power. When an infrared radiation carrier is present, the DC level established at the inverting input of comparator 1036 is less than the threshold voltage on the non-inverting input. Accordingly, the Carrier Present signal is high. Should the infrared radiation carrier disappear, the DC level at the inverting input of comparator 1036 will rise to a level above the threshold, thereby causing the Carrier Present signal to go low.

The signal on line 1000 is also applied to sub-carrier shift detection circuitry. This circuitry includes a DC extraction circuit comprising resistor 1042 and capacitor 1044. The resulting DC level is applied to comparator 1046, the threshold for which is established at the inverting input by a voltage divider network formed by resistors 1048 and 1050.

The sub-carrier shift detection circuitry monitors the output of the FM detector for a change in the DC output level. The DC output level will change only if there is a change in the center frequency of the sub-carrier signal. Of course, a shift up in center frequency of the sub-carrier occurs when the control switch on the remote microphone unit is actuated to the off position. The shift up in frequency causes a corresponding upward shift in the average DC level established on the non-inverting input of comparator 1046. When the rise in DC level goes above the reference established on the inverting input, comparator 1046 changes states from low to high.

Figure 15:
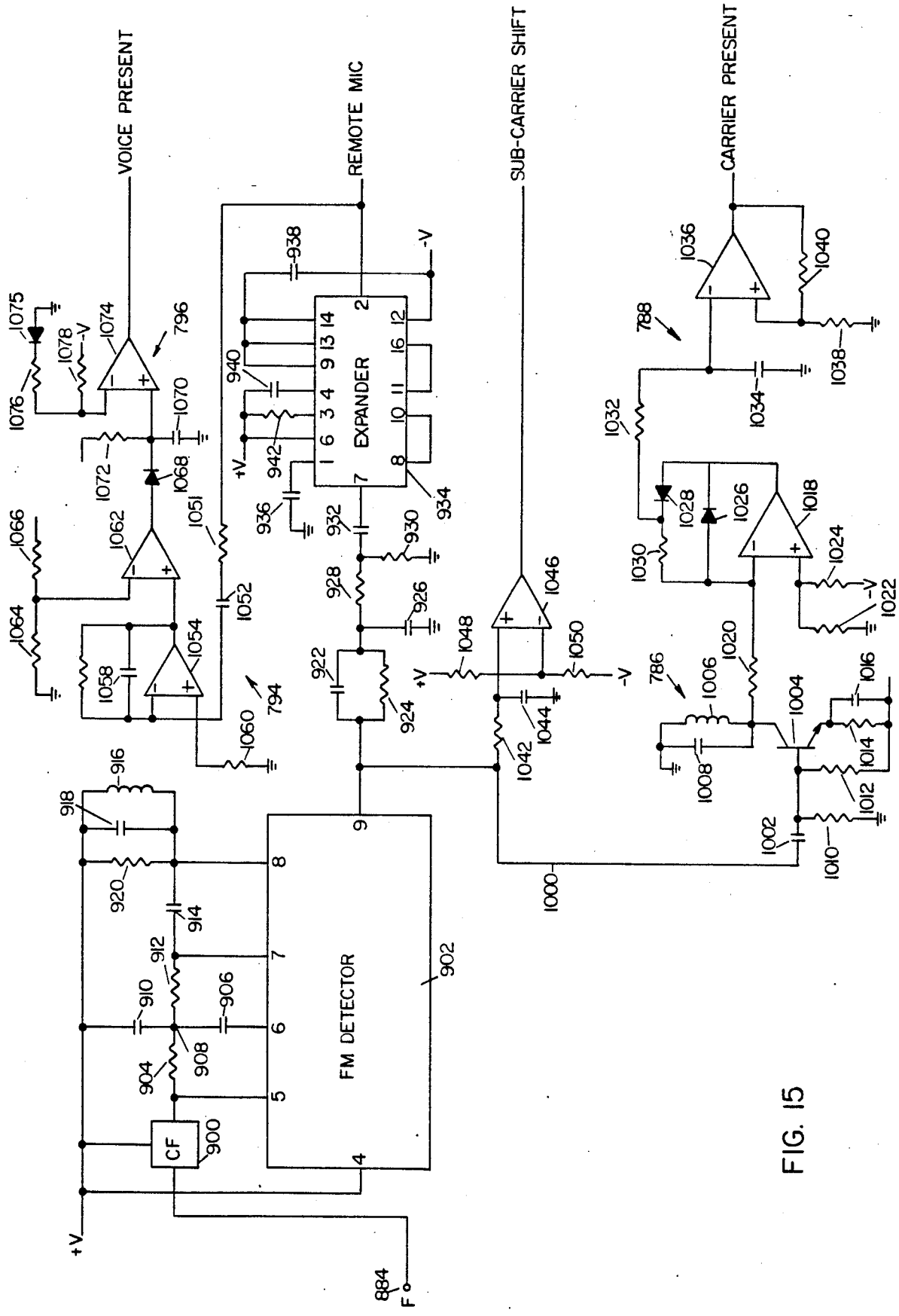
FIG. 15 is a schematic diagram of the band pass filter, limiter, de-emphasis, expander, carrier detector, voice detector, and carrier shift detector.

The remaining detector diagrammed in FIG. 15 is the audio frequency detector circuit 794 and time delay circuit 796, which produces the Voice Present signal. The input to this circuitry is the remote microphone electrical voice signal available at pin 2 of expander circuit 934. The signal is applied to resistor 1050 and coupled through capacitor 1052 to a filter and gain stage comprising operational amplifier 1054. A feedback network between the inverting input and the output of op-amp 1054 includes resistor 1056 and capacitor 1058. The non-inverting input is tied to ground through resistor 1060. The bandwidth of the filter is established around a center frequency of about 1 KHz, where there is the maximum energy in the remote microphone electrical voice signal.

The output of the filter-gain stage is applied to the non-inverting input of a comparator 1062 having a threshold set thereon by resistors 1064 and 1066. Every time the audio frequency signal amplitude at the output of filter 1054 goes above the threshold set for the comparator, comparator 1062 changes state and produces an output pulse. Accordingly, in response to a remote microphone electrical voice signal, comparator 1062 will produce a series of constant amplitude pulses.

The pulses produced by comparator 1062 are applied to a rectifier and filter circuit including diode 1068 and capacitor 1070. A discharge path is provided through resistor 1072. Capacitor 1070 has a discharge time constant which establishes a certain period of time required for discharging to a particular voltage. The time constant is established by the values of capacitor 1070 and resistor 1072, and preferably is about 220 milliseconds.

The rectifier-filter circuit is connected to the non-inverting input of a comparator 1074. The threshold at the inverting input is established by resistors 1076 and 1078. Thus, comparator 1074 will very rapidly assume a high state indicative of the presence of voice after the remote microphone electrical voice signal is input to the circuitry. However, when there is an absence of voice for the time it takes to discharge capacitor 1070 down to the threshold on comparator 1074, the output of comparator 1074 changes from high to low.

4. Variable Loss Circuits and Controller

Turning now to FIG. 16, the microphone filter output is coupled through capacitor 1080 to each of three active, positive rectifier circuits 1082, 1084 and 1086. The microphone signal is applied through input resistors 1088, 1090 and 1092 to the inverting input of each of operational amplifiers 1094, 1096 and 1098. A bias voltage is established on the non-inverting input of each of op-amps 1094 and 1096 by resistors 1100 and 1102. The non-inverting input of op-amp 1098 is connected to ground. Each rectifier includes a feedback resistor connected in series with a diode. The resistors are referenced by numerals 1104, 1106 and 1108; and the diodes are indicated by reference numerals 1110, 1112 and 1114. Additionally, a shunt diode is connected between the output and inverting input of each op-amp. These diodes are indicated by the references numerals 1116, 1118 and 1120. The output of each rectifier circuit includes a resistor and filter capacitor. For rectifier circuit 1082, these are resistor 1122 and capacitor 1124. Resistor 1126 and capacitor 1128 are provided for rectifier 1084. Resistor 1130 and capacitor 1132 are connected to rectifier 1086.

During a negative half cycle of the microphone signal, each filter capacitor is charged through its respective rectifier diode 1110, 1112 and 1114. During each positive half cycle of the microphone signal, the filter capacitors are discharged. Discharge of capacitor 1124 is through resistors 1122, 1104 and diode 1116. Similarly, discharge of capacitor 1128 is through resistor 1126, 1106 and diode 1118. Correspondingly, for capacitor 1132, discharge is through resistors 1130, 1108 and diode 1120.

Each rectifier circuit converts the microphone electrical voice signal into a proportional DC level. The respective DC levels produced by the rectifier circuits are designated as Rectifier 1, Rectifier 2, and Rectifier 3.

Figure 17:
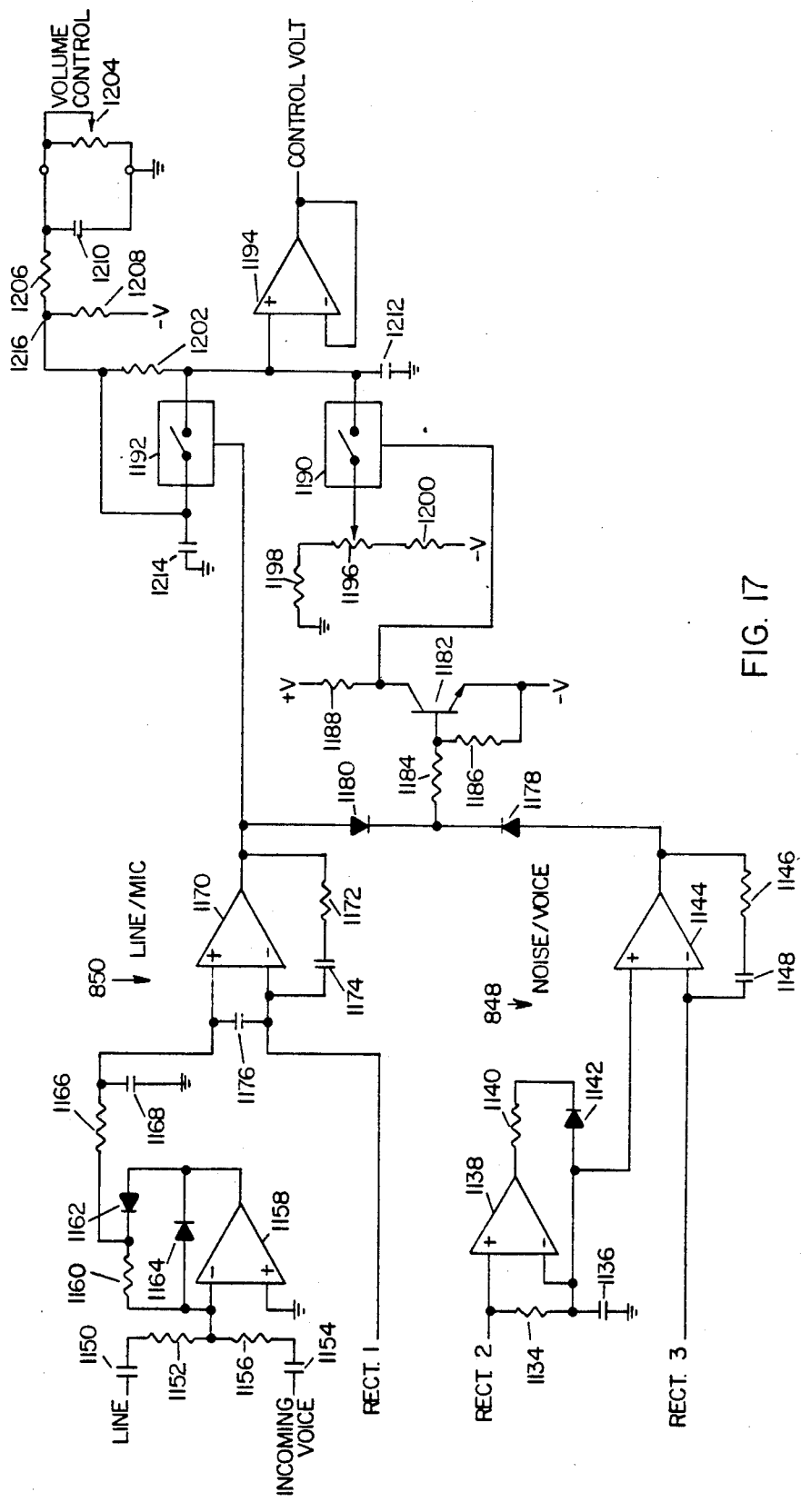
FIG. 17 is a schematic diagram of the variolosser controller.

Referring now to FIG. 17, the rectified signals designated Rectifier 1, Rectifier 2, and Rectifier 3 are applied as inputs to comparators 848 and 850. As will be recalled, a comparison is made between background noise in the microphone electrical voice signal and actual voice in that signal. Additionally, a comparison is made between the level of the incoming electrical voice signal and the microphone electrical voice signal. These comparisons are made by comparators 848 and 850, respectively.

The signal Rectifier 2 is applied to a circuit for producing a variable threshold voltage proportional to the average background noise of the room in which the speaker-phone user is located. The rectified microphone electrical voice signals are actually the sum of voice and room noise. By integrating the rectified microphone electrical voice signal using an appropriate time constant chosen to respond to the steady state type of background noises, such as fans and motors, a voltage level is developed which is representative of the average room noise. The primary time constant for average background noise is established by resistor 1134 and capacitor 1136. Operational amplifier 1138 functions to shorten the time constant for decreasing trends in background noise. For example, if an office door has been opened to a noise source outside the room, and the door is then closed, the reduced background noise level will be instantly corrected for by the action of op-amp 1138 and the feedback network of resistor 1140 and diode 1142. This is because increasing noise levels reverse bias diode 1142, causing op-amp 1138 to have no effect on the charging time constant of resistor 1134 and capacitor 1136.

The variable bias voltage developed on capacitor 1136 is applied to the non-inverting input of comparator 1144. The signal Rectifier 3 is applied to the inverting input of comparator 1144. A feedback resistor 1146 and capacitor 1148 establish the switching response of the comparator.

Figure 18:
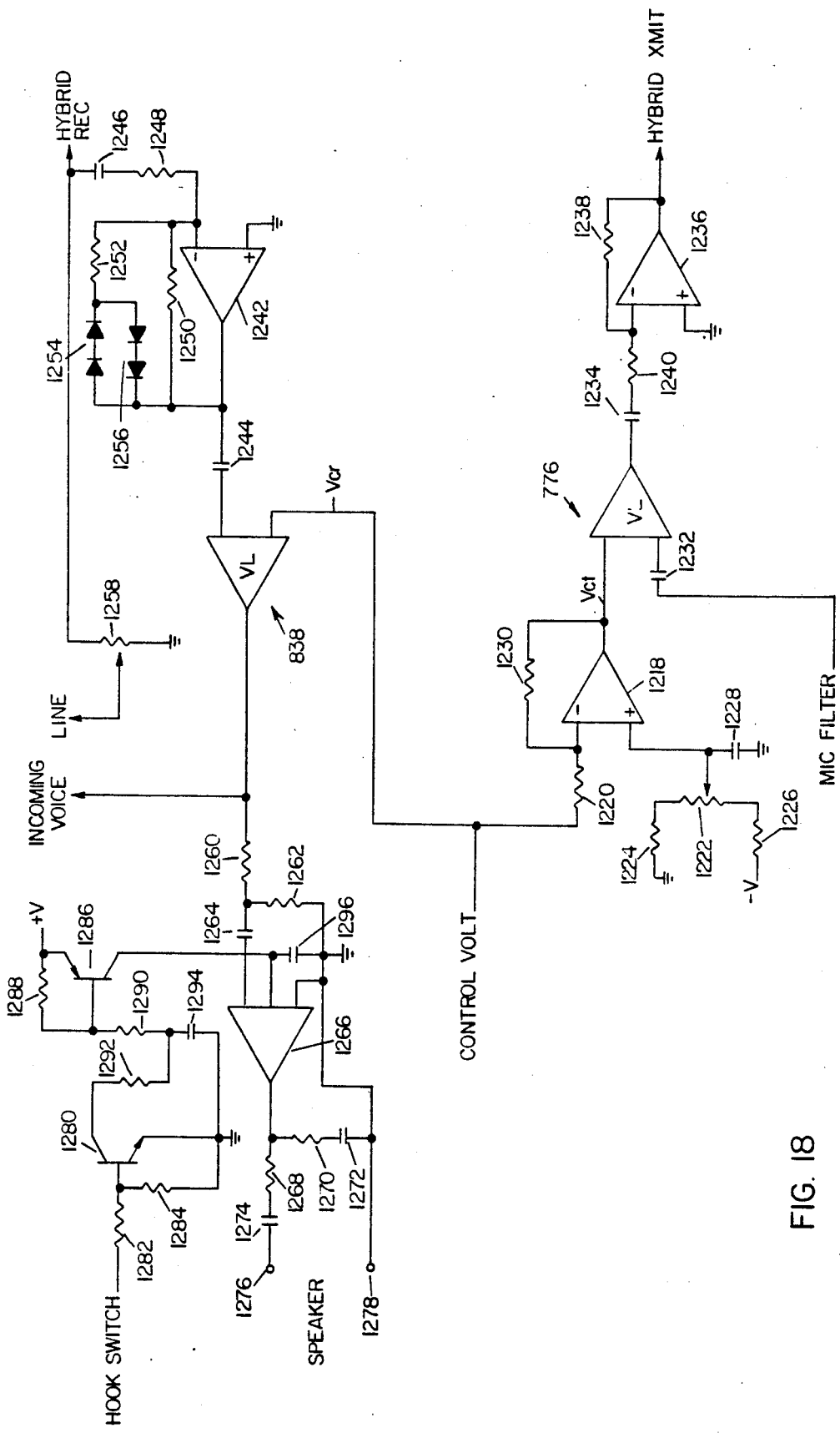
FIG. 18 is a schematic diagram of the transmit and receive variable loss circuits and audio amplifier.

The Line signal and the incoming electrical voice signal are obtained from the circuitry in FIG. 18. The manner in which these two signals are obtained will be described; however, generally, the Line signal is taken directly from the hybrid circuit and the incoming electrical voice signal is taken from the receive variable loss circuit.

The Line signal is coupled through capacitor 1150 to a resistor 1152. Similarly, the incoming electrical voice signal is coupled through capacitor 1154 and applied to input resistor 1156. The input resistors 1152 and 1156 are connected together at a summing node connected to the inverting input of operational amplifier 1158 which forms a part of an active positive rectifier circuit similar to those shown in FIG. 16. The rectifier circuit further includes feedback resistor 1160 and diodes 1162 and 1164. At the rectifier circuit output is a filter circuit including resistor 1166 and capacitor 1168.

The values of the input resistors 1152 and 1156 provide weighting factors for the Line signal and the incoming electrical voice signal. It is the sum of these two weighted signals that is rectified. Accordingly, the voltage on capacitor 1168 is proportional to the sum of the two signals with the weighting factors applied.

The voltage on capacitor 1168 is applied to the non-inverting input of comparator 1170 in the Line/Microphone comparator circuit. The Rectifier 1 signal is applied to the inverting input. A feedback network of resistor 1172 and capacitor 1174, which corresponds to feedback network for comparator 1144, is also included. By making the feedback networks identical time constants, equal delays are provided through the two comparators and the possibility of "chatter" is reduced. Connected between the inverting and non-inverting inputs of comparator 1170 is capacitor 1176.

The no signal bias level of comparator 1170 is such that its output is resting in a low level state corresponding to a microphone selection state. The bias is obtained through the circuitry in FIG. 16 beginning at the junction of resistors 1100, 1102 and followed by DC coupling through the rectifier circuit, particularly diode 1110 and resistor 1122, to the inverting input of comparator 1170.

The no signal bias level of comparator 1144 is such that its output is resting in the high level state indicative of a Noise Present state. The bias level is obtained from the circuitry in FIG. 16 at the same junction of resistors 1100 and 1102. The bias voltage is DC coupled through rectifier circuit 1086, particularly diode 1114 and resistor 1130. The bias voltage is further applied through resistor 1134 to the non-inverting input of comparator 1144.

The outputs of comparators 1144 and 1170 are applied to logic circuitry comprising diodes 1178, 1180 and a switching circuit comprising transistor 1182 and associated resistors 1184, 1186 and 1188. The output of comparator 1170 is also applied to electronic switch 1192.

Switches 1190 and 1192 establish the input voltage to buffer amplifier 1194 by changing the configuration of the voltage divider network connected to the non-inverting input thereof. Specifically, switch 1190 connects or disconnects from amplifier 1194 the wiper of potentiometer 1196 which is connected in series with resistors 1198 and 1200 to form a voltage divider network. Switch 1192 selectively shunts resistor 1202 in and out of a network that further includes volume control potentiometer 1204 and resistors 1206, 1208. Filter capacitors 1210 and 1214 are further included in the networks as shown, and a capacitor 1212 is connected to the non-inverting input of amplifier 1194.

Diodes 1178, 1180 and transistor circuit 1182 form a positive NOR gate function. The collector of transistor 1182 is high if both comparator outputs are low. This, of course, occurs when the microphone electrical voice signal is greater than the Line signal, and it is also comprised of voice rather than noise. The high level on the collector of transistor 1182 causes switch 1190 to close. This connects the voltage from the voltage divider network to buffer 1194.

If the output of comparator 1170 is high, indicating that the incoming electrical voice signal is greater than the microphone electrical voice signal, switch 1190 is opened by reason of the collector of transistor 1182 going low and switch 1192 is closed. The closure of switch 1192 applies the voltage at node 1216 to buffer 1194.

When the output of comparator 1144 is high and the output of comparator 1170 is low, indicative of a condition wherein the microphone electrical voice signal is greater than the Line signal, but it is noise rather than voice, both switches 1190 and 1192 are open. In this situation, capacitor 1212 is slowly charged through resistor 1202, causing the control voltage at the output of buffer 1194 to slowly drift to the receive selection state. This action helps compensate for the ability of the microphone electrical voice signal to gain control of the variolosser circuit easier than the incoming electrical voice signal.

Referring now to FIG. 18, the control voltage signal is applied to a transmit variable loss stage 776 and a receive variable loss stage 838. The variable loss circuits are closely matched in regard to their loss as a function of control voltage; and additionally, they vary the loss as a function of the logarithm of the control voltage. As mentioned previously, the transmit and receive variable loss circuits are controlled so as to maintain a constant loop gain. That is, as loss is reduced in one variable loss circuit, the other variable loss circuit increases its loss by the same amount. This is mathematically stated as follows: *receive loss (dB)+transmit loss (dB)=constant (dB)*. The variable loss circuit control voltage required for constant loop gain are $V_{cr}$ and $V_{ct}$, where $V_{cr}$ is the control voltage to the receive variable loss circuit and $V_{ct}$ is the control voltage to the transmit variable loss circuit. These control voltages may be placed in a mathematical expression as follows: $V_{cr} + V_{ct} = K$, where K is a constant depending upon the desired loop gain.

The control voltage signal from buffer 1194 in FIG. 17 is applied directly to variable loss circuit 838 as $V_{cr}$. To obtain the signal $V_{ct}$, the control voltage signal is applied to a circuit comprising operational amplifier 1218. The control voltage signal is applied to the inverting input of op-amp 1218 through input resistor 1220. The non-inverting input is connected to a voltage divider network comprising potentiometer 1222 and resistors 1224, 1226. A filter cap 1228 is further included. Feedback resistor 1230 sets the gain of the circuit at unity. This circuit and the offset bias adjustment provided at the wiper of potentiometer 1222 generates the control voltage $V_{ct}$ from $V_{cr}$. The output voltage of the circuit is equal to $K - V_{cr}$.

In addition to the control voltage $V_{ct}$, the variable loss circuit 776 has coupled thereto by capacitor 1232, the microphone filter output signal from op-amp 974 in FIG. 16. The microphone electrical voice signal available at the output of the variable loss circuit is coupled through capacitor 1234 to a buffer and gain stage comprising operational amplifier 1236, feedback resistor 1238 and input resistor 1240. The output of the buffer is applied to the hybrid in FIG. 19.

In addition to the control voltage $V_{cr}$, the receive variable loss circuit receives the incoming line electrical voice signal. This signal is obtained from an amplifier circuit including operational amplifier 1242 and is coupled to the variable loss circuit by capacitor 1244. The incoming line electrical voice signal is coupled through capacitor 1246 to input resistor 1248 connected to the inverting input of op-amp 1242. The feedback network connecting between the output and the inverting input of op-amp 1242 includes a resistor 1250 in parallel with a series combination of resistor 1252 and cross-connected diode pairs 1254 and 1256. This circuit provides gain to the line signal from the hybrid circuit. The diodes and resistor 1252 serve to reduce the gain of the circuit when dial tone is one the line.

The Line signal used in the circuitry shown in FIG. 17 is obtained from potentiometer 1258. The incoming electrical voice signal is the output of variable loss circuit 838.

The incoming electrical voice signal from the receive variable loss circuit is applied to a voltage divider network comprising resistors 1260 and 1262, and it is then coupled through capacitor 1264 to audio amplifier 1266. The output signal of the audio amplifier is applied to a frequency response correction network of resistors 1268, 1270 and capacitors 1272, 1274 before application to a speaker connected to terminals 1276, 1278.

The operation of audio amplifier 1266 is delayed for a period of time following an indication by the Hook Switch signal. To go off-hook in answer of an incoming call. This delay is provided by operation of a two-stage switching circuit. The first stage comprises transistor 1280 and resistors 1282, 1284. The second stage includes transistor 1286 and resistors 1288, 1290. The first stage is connected to the second stage by resistor 1292. When the Hook Switch signal is low, transistor 1280 is turned-off and capacitor 1294 is charged-up to a level which keeps transistor 1286 turned-off also. This prevents capacitor 1296 connected to the audio amplifier enable input from charging-up to a voltage level that enables operation of the amplifier.

When the Hook Switch signal goes high, transistor 1280 is turned-on, which discharges capacitor 1294 through resistor 1292. This causes the voltage on the base of transistor 1286 to be lowered, thereby turning it on. Current through transistor 1286 charges capacitor 1296 up to a level that enables audio amplifier 1266 for operation.

5. Hybrid Circuit

The microphone electrical voice signal available at the output of buffer 1236 in FIG. 18 is applied to the hybrid transmit circuit via coupling capacitor 1300. The signal is to be transmitted onto the phone lines through transformer 1302; the signal should not come through the hybrid receive circuit signal path 1304. The signal coupled through capacitor 1300 is applied to the base of transistor 1306 which is biased with resistors 1308 and 1310. The collector of transistor 1306 connects to one side of transformer 1302 and the emitter connects to resistor 1312.

To prevent the microphone electrical voice signal from reaching the base of transistor 1318, resistors 1320 and 1322 are provided. These resistors connect together at node 1324 and to the collector and the emitter, respectively, of transistor 1306. The values of resistors 1320 and 1322 are chosen so as to establish equal but oppositely phased currents through each into node 1324. Accordingly, there is a cancellation at the base of transistor 1318 of the microphone electrical voice signal. Resistor 1314 and capacitors 1316, 1336 are provided to enhance the cancellation at node 1324 in that they compensate for the complex impedance of transformer 1302.

The incoming electrical voice signals brought in over the ring and tip lines, including resistors 1326 and 1328, are coupled through capacitor 1316 to transistor 1318 and made available over the hybrid receive line 1304. The hybrid circuit shown in FIG. 19 further includes protection diodes 1330 and 1332 in parallel with resistor 1334 and capacitor 1336.

Connection of transformer 1302 to the telephone ring and tip lines is by means of a hook switch relay including relay coil 1338 and relay contacts 1340, 1342. The relay coil, which has diode 1344 in parallel with it, is connected to the collector of switching transistor 1346. The Hook Switch signal is applied to a network of input resistors 1348 and 1350. When the Hook Switch signal goes low, transistor 1346 is turned on, and relay coil 1338 is energized to close the relay contacts.

6. Logic Circuit

Figure 20:
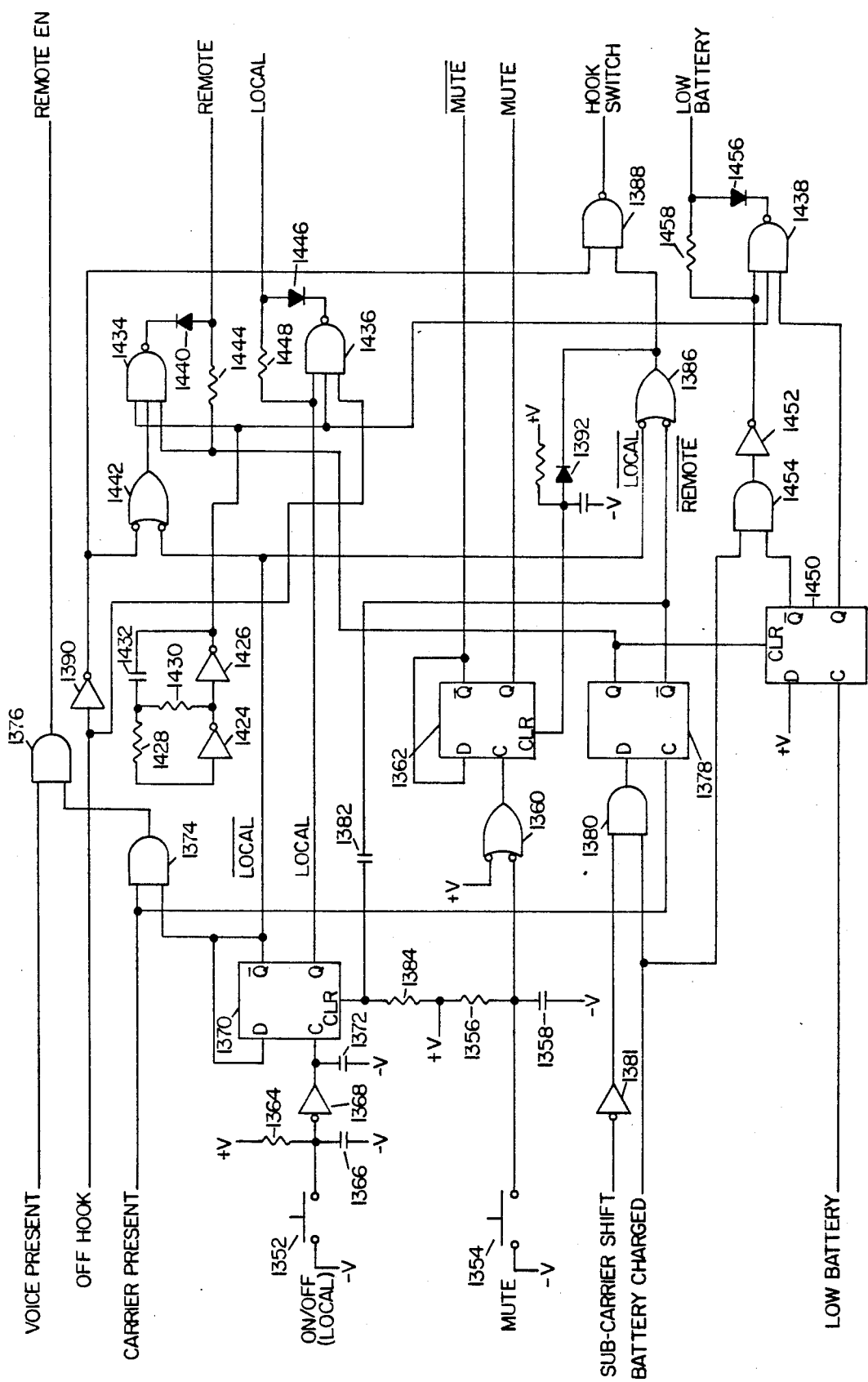
FIG. 20 is a schematic diagram of the control logic circuitry.

In FIG. 20, a schematic diagram of the logic circuitry used in the base station is presented. This circuitry utilizes the Voice Present, Carrier Present and Sub-Carrier Shift signals generated by the circuitry in FIG. 15. Additional inputs include a Low Battery signal and a Battery Charge signal obtained from the circuitry shown in FIG. 21. The front panel on/off switch 1352 and mute switch 1354 provide additional input signals to the circuitry.

The mute switch 1354 when actuated drops to a lower voltage the connection point between resistor 1356 and capacitor 1358. This causes gate 1360 to issue a clock pulse to flip-flop 1362. The outputs of flip-flop 1362 produce the Mute and $\overline{\text{Mute}}$ signals. Further, flip-flop 1362 is connected in a configuration so as to toggle upon the occurrence of each clock pulse.

Local on/off switch 1352 similarly connects to the connection point of resistor 1364 and capacitor 1366. The actuation of switch 1352 takes the connection point to a lower voltage resulting in inverter 1368 producing a clock pulse to flip-flop 1370. The clock pulse is slowed somewhat by capacitor 1372. The outputs of flip-flop 1370 provide the Local and $\overline{\text{Local}}$ signals.

The $\overline{\text{Local}}$ signal along with the Carrier Present signal are applied to gate 1374. The output of gate 1374 is in turn combined with the Voice Present signal in gate 1376 to generate the Remote Enable signal. Thus, when the base station is not in the local mode, and both carrier and voice are present, the Remote Enable signal is generated.

The Carrier Present signal, when it appears, clocks flip-flop 1378. The state that flip-flop 1378 assumes at that time is dependent upon the condition at the output of gate 1380. If the output of gate 1380 is high, then flip-flop 1378 will be set. That is, the Q output will be high producing the Remote signal. The $\overline{\text{Q}}$ output is coupled to the clear input on flip-flop 1370 through capacitor 1382. When it goes low, producing a momentary negative-going spike is produced that clears flip-flop 1370. After passage of the negative pulse, the clear input to flip-flop 1370 is again pulled high through resistor 1384.

The low condition on the $\overline{\text{Q}}$ output of flip-flop 1378 is further applied as an input to gate 1386, which in turn provides an input signal to gate 1388. The other input to gate 1388 is obtained from inverter 1390 which receives the Off-Hook signal. If the telephone handset is not off-hook, the output of inverter 1390 is high; and consequently, gate 1388 produces a low Hook Switch output signal. This, of course, results in the hook switch relay switching circuit shown in FIG. 19 causing the hook switch relay contacts to close.

Gate 1386 also issues a high output signal when flip-flop 1370 is in the local mode. Thus, the hook switch relay can be closed by actuation of the local on/off switch to place the apparatus in the local mode, provided the telephone handset is not off-hook.

Until the output of gate 1386 goes high, it pulls the clear input to flip-flop 1362 low through diode 1392. This causes the $\overline{\text{Mute}}$ signal to be high, thereby allowing the selection switches 944, 956 in FIG. 16 to be under the control of the Remote Enable signal.

Returning to gate 1380, the condition at its output is established by the output of inverter 1381 and the Battery Charged signal. The input to inverter 1381 is the Sub-Carrier Shift signal. If, when there is the generation of a Carrier Present signal, there is also a Sub-Carrier Shift signal, then flip-flop 1378 is reset. This results in the microphone electrical voice signal path being muted and the Hook Switch signal going high (i.e., an on-hook condition).

Figure 21:
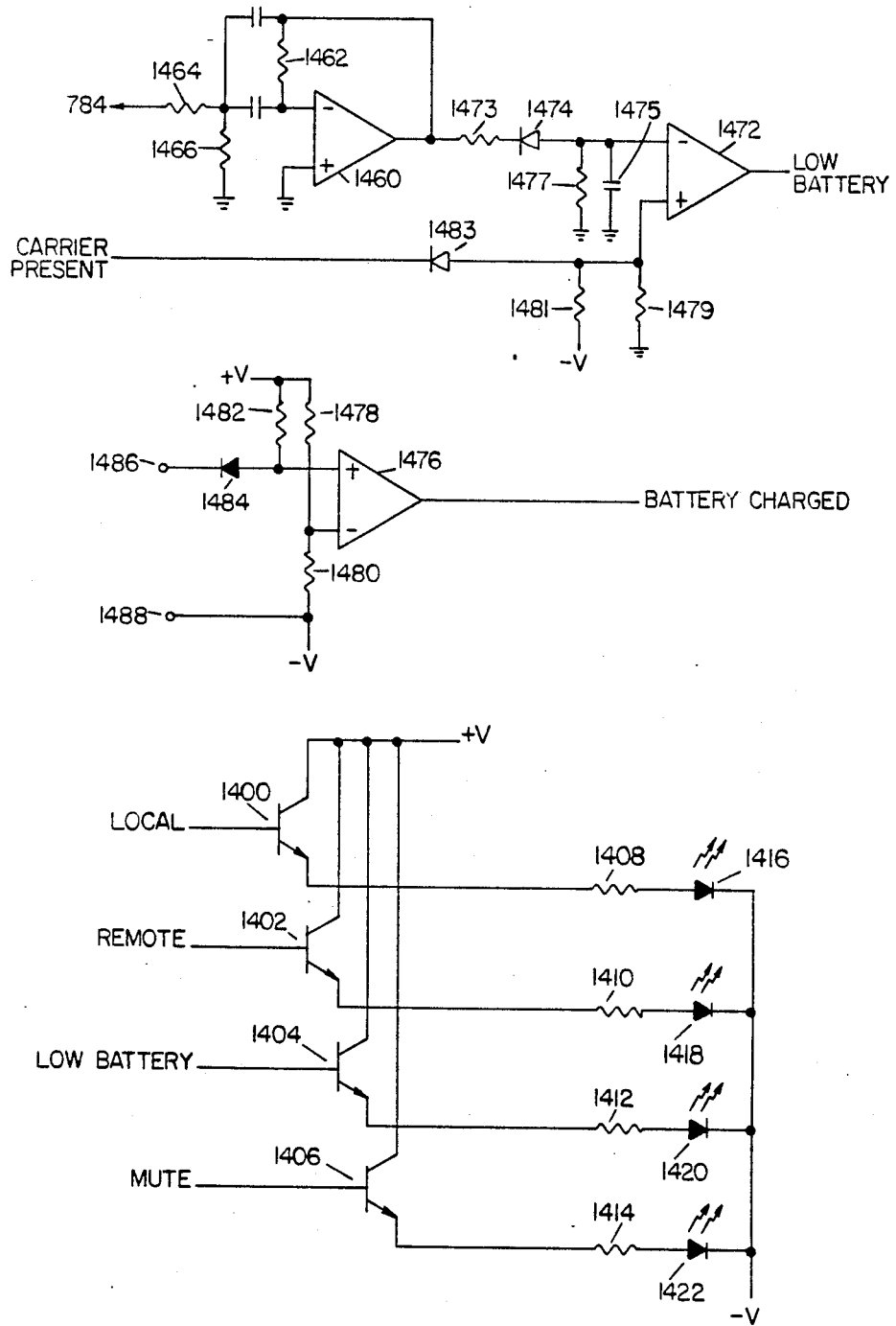
FIG. 21 presents schematic diagrams of the low battery detector, battery charging detector, and the mode display.

The remaining circuitry in FIG. 20 is control circuitry for the front panel mode indicators diagrammed in FIG. 21. Accordingly, considering FIGS. 20 and 21 together, the Local, Remote, Low Battery and Mute signals generated in FIG. 20 are applied to transistor drivers 1400, 1402, 1404 and 1406. Connected to each driver is a resistor and light-emitting diode. These include resistors 1408, 1410, 1412 and 1414. The light-emitting diode visual indicators are referenced by numerals 1416, 1418, 1420 and 1422.

In order to provide for a flashing visual indication for the remote, local and low battery indicators, an oscillator circuit comprising inverters 1424 and 1426, resistors 1428 and 1430, and capacitor 1432 is included. The output of this oscillator is applied as an input to each of gates 1434, 1436 and 1438. The output of gate 1434 pulls the Remote signal line low through diode 1440 when a high condition is present on each input. This occurs when, in addition to the oscillator output, gate 1442 is high and the Q output of flip-flop 1378 is high. Gate 1442 is high when either the telephone handset is off-hook or the local on/off switch 1352 is actuated. Gate 1436 pulls the Local signal line low through diode 1446 when the telephone handset is off hook during the time that the base station is in the local mode. A resistor 1448 is further included in the circuitry.

When a low battery indication is produced, flip-flop 1450 is clocked thereby and set. The Q output of flip-flop 1450 is applied along with the oscillator output and the output of inverter 1452 to gate 1438. Since gate 1454 receives as an input the $\overline{\text{Q}}$ output of flip-flop 1450, its output will be low, which causes the input to inverter 1452 to be low. This results in the Low Battery signal line flashing. Flip-flop 1450 is cleared when transmission from the remote microphone unit terminates, as indicated by the Q output of flip-flop 1378 going to a low state. This establishes a high level at the $\overline{\text{Q}}$ output of flip-flop 1450 and causes the output of gate 1454 to go high if the Battery Charged signal is high. This occurs when the remote microphone unit is placed in the cradle of the base station and is recharged.

Referring to FIG. 21, the Low Battery signal is produced by an active bandpass filter circuit comprising operational amplifier 1460. Also included in the filter circuit are resistors 1462, 1464, 1466 and capacitors 1468, 1470. The output of the filter is applied to a level detector comprising comparator 1472. The filter output is a sinusoidal signal present only when the low battery detector in the remote microphone unit detects a low battery condition. The output of the filter is connected to the comparator by resistor 1473 and diode 1474. The filter output is therefore negative detected. The filter output charges capacitor 1475 with a time constant determined by its value and that of resistor 1473. The discharge path is through resistor 1477. The DC level on capacitor 1475 is compared to the DC level established by a voltage divider network comprising resistors 1479 and 1481. Diode 1483 disables comparator 1472 when Carrier Present is low, thereby preventing erroneous outputs.

The Battery Charged detection circuit includes a comparator 1476 having a threshold voltage established on its inverting input by resistors 1478, 1480. Connected to the non-inverting input are resistor 1482 and diode 1484. When the remote microphone unit is placed in the cradle in the base station housing, terminals to the battery are placed in contact with terminals 1486 and 1488. If the voltage of the battery is below a level that forward biases diode 1484, then current flows through resistor 1482 and diode 1484 to charge the battery. When the battery has charged up to a level which reverse biases diode 1484, current flow stops and there is negligible voltage drop across resistor 1482. At this point, the threshold voltage on the inverting input of comparator 1476 is exceeded and the comparator output switches from low to high. The high level causes the output of gate 1454 in FIG. 20 to go high, resulting in the Low Battery signal produced by inverter 1452 going low. This results in the low battery visual indicator light in FIG. 21 being extinguished.

TABLE OF COMPONENTS

C = Capacitor  D = Diode
Q = Transistor  R = Resistor  L = Inductor

| COMPONENT | IDENTIFICATION |
|---|---|
| FIG. 5 | |
| MIC 200 | |
| C 202 | 2.2 μF |
| R 204 | 47K |
| R 206 | 14.0K |
| R 208 | Labset 1% |
| C 210 | .0027 μF |
| C 212 | 15 μF |
| C 260 | 0.1 μF |
| R 262 | 51K |
| R 264 | 51K |
| C 266 | 10 μF |
| C 268 | 10 μF |
| C 270 | 150 pF |
| C 272 | 3.3 μF |
| R 274 | 511 Ω, 1% |
| R 380 | 90.9K, 1% |
| C 382 | 5600 pF |
| C 383 | 1 μF |
| R 384 | 10.0K, 1% |
| R 385 | 1K Ω |
| Q 386 | 2N 3904 |
| R 388 | Labset 1% |
| R 390 | 5.1K |
| C 392 | 1 μF |
| R 396 | 500 Ω, 1T |
| R 398 | 1.1K |
| C 400 | 1000 pF, Polyester |
| C 402 | 820 pF, NPO |
| C 488 | 0.01 μF |
| R 490 | 5.1K |
| Q 494 | 2N 2222 |
| R 496 | 11.8K, 1% |
| R 498 | 1.13K, 1% |
| R 500 | 750 Ω |
| R 502 | 100 Ω |
| Q 504 | 2N 2907 |
| R 506 | 2.7 Ω |
| D 508, 510, 512, 514 | 1N 4148 |
| C 516 | 6.8 μF |
| L 518 | 100 μF |
| C 534 | 4.7 μF |
| C 582 | 2.2 μF |
| R 584 | 499K, 1% |
| R 592 | 10.0K, 1% |
| R 594 | 10.0K, 1% |
| C 596 | 0.1 μF |
| R 626 | 20.0K 1% |
| R 628 | Labset 1% |
| C 630 | 1 μF |
| Q 690 | 2N 4870 |
| R 692 | 30K, 5% |
| R 694 | LABSET |
| C 696 | .0068 μF, 5% |
| Q 708 | MPSA13 |
| Q 710 | VN0610L |
| R 712 | 10 M |
| R 716 | 40.2K, 1% |
| C 718 | 1 μF |
| R 720 | 10 M |
| FIG. 6 | |
| R 230 | 12.95K |
| R 232 | 10.8K |
| R 234 | 3.6K |
| R 236 | 9.0K |
| R 238 | 7.2K |
| R 250 | 5.4K |
| FIG. 7 | |
| R 530 | 7.2K |
| FIG. 8 | |
| R 552 | 14.4K |
| R 554 | 10.8K |
| R 556 | 3.1K |
| R 558 | 400 Ω |
| R 560 | 400 Ω |
| R 564 | 450 Ω |

-continued
TABLE OF COMPONENTS

C = Capacitor  D = Diode
Q = Transistor  R = Resistor  L = Inductor

| COMPONENT | IDENTIFICATION |
|---|---|
| R 568 | 450 Ω |
| R 570 | 7.2K |
| R 572 | 7.2K |
| R 576 | 450 Ω |
| R 578 | 14.4K |
| FIG. 9 | |
| R 600 | 450 Ω |
| R 606 | 30K |
| FIG. 10 | |
| R 284 | 1.8K |
| R 296 | 450 Ω |
| R 298 | 900 Ω |
| R 324 | 14.4K |
| R 326 | 14.4K |
| R 334 | 200 Ω |
| R 340 | 14.4K |
| R 342 | 3.6K |
| R 344 | 2.7K |
| R 348 | 14.4K |
| R 350 | 14.4K |
| R 352 | 9.0K |
| R 354 | 7.2K |
| R 356 | 7.2K |
| R 358 | 900 Ω |
| R 360 | 1.8K |
| R 366 | 18K |
| FIG. 11 | |
| R 416 | 1350 Ω |
| R 418 | 100 Ω |
| R 420 | 5.4K |
| R 422 | 1.8K |
| R 430 | 18K |
| R 444 | 900 Ω |
| R 446 | 900 Ω |
| R 448 | 7.2K |
| R 464 | 3.6K |
| R 468 | 3.6K |
| R 476 | 7.2K |
| R 482 | 7.2K |
| R 488 | 4.5K |
| FIG. 12 | |
| R 636 | 7.2K |
| R 638 | 10.8K |
| R 640 | 60K |
| R 642 | 60K |
| R 648 | 7.2K |
| R 650 | 7.2K |
| R 652 | 450 Ω |
| R 654 | 450 Ω |
| R 676 | 3.6K |
| R 678 | 9.45K |
| R 680 | 200 Ω |
| R 682 | 3.6K |
| R 684 | 5.4K |
| R 686 | 14.4K |
| R 688 | 1.8K |
| FIG. 14 | |
| D 860 | BPW 34 |
| D 862 | BPW 34 |
| D 864 | BPW 34 |
| D 866 | BPW 34 |
| Q 868 | 2N 5484 |
| R 870 | 1K |
| L 872 | 3.6 M |
| R 874 | 100 Ω |
| C 876 | 1.0 μF TANT |
| R 878 | 100K |
| C 880 | 0.01 μF |
| 882 | MC 1350 |
| R 886 | 1.5K |
| R 888 | 10K |
| R 890 | 10K |
| C 892 | 0.01 μF |
| FIG. 15 | |
| CFW 900 | 455 B |
| FM Detector 902 | MPS 5071 All |

-continued

TABLE OF COMPONENTS

C = Capacitor  D = Diode
Q = Transistor  R = Resistor  L = Inductor

| COMPONENT | IDENTIFICATION |
|---|---|
| R 904 | 1K 5 |
| C 906 | 0.1, 10% |
| C 910 | 0.1, 10% |
| R 912 | 47K |
| C 914 | 10 PF MICA |
| L 916 | 1MH, 7MN - A580 SHM |
| C 918 | 100 PF MICA |
| R 920 | 27K |
| C 922 | .01 μF |
| R 924 | 5K 1 |
| C 926 | .47 |
| R 928 | 8K 2 |
| R 930 | 10K |
| C 932 | .47 μF, 10% |
| Expander 934 | XR 2216 A10 |
| C 936 | 50 pF MICA |
| C 938 | 10 μF |
| C 940 | 3.3 TANT |
| R 942 | 10K |
| C 1002 | .01, 10% |
| L 1006 | 3.6 MH |
| C 1008 | 680 pF, MICA |
| R 1010 | 10K |
| R 1012 | 10K |
| R 1014 | 1K |
| C 1016 | .01 |
| R 1020 | 22K |
| R 1022 | 1K |
| R 1024 | 43K |
| R 1030 | 47K |
| R 1032 | 10K |
| C 1034 | .01 |
| R 1038 | 10K |
| R 1040 | 390K |
| R 1042 | 100K |
| C 1044 | .47 |
| R 1048 | LS |
| R 1050 | 10K |
| R 1051 | 10K |
| C 1052 | .15, 10% |
| R 1056 | 100K |
| C 1058 | .001 μF |
| R 1060 | 9K 1 |
| R 1064 | 1K 8 |
| R 1066 | 4K 3 |
| C 1070 | 0.22 μF |
| R 1072 | 1% |
| R 1076 | 1K 8 |
| R 1078 | 4K 3 |
| FIG. 16 | |
| C 946 | 1 μF |
| R 948 | 1K |
| R 952 | 47K |
| C 954 | 680 pF |
| R 958 | 10K |
| R 962 | 22K |
| R 964 | 10K |
| R 966 | 10K |
| R 976 | 6K 34, 1% |
| R 978 | 17K 4, 1% |
| R 980 | 63K 4, 1% |
| C 982 | 100 pF |
| C 984 | 0.01 μF |
| C 1080 | 0.047 μF, 10% |
| R 1088 | 82K |
| R 1090 | 43K |
| R 1092 | 7K 5 |
| R 1100 | 300K |
| R 1102 | 2K |
| R 1104 | 300K |
| R 1106 | 150K |
| R 1108 | 27K |
| R 1122 | 22K |
| C 1124 | .022 μF |
| R 1126 | 2K 2 |
| C 1128 | .22 μF |
| R 1130 | 2K 2 |

-continued

TABLE OF COMPONENTS

C = Capacitor  D = Diode
Q = Transistor  R = Resistor  L = Inductor

Figure 19:
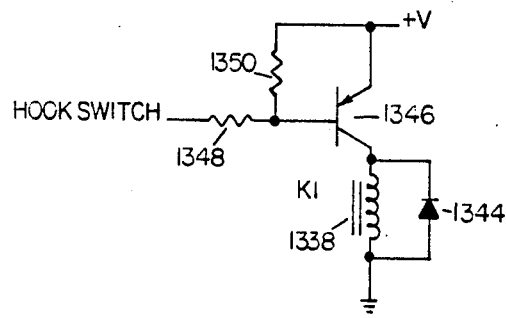
FIG. 19 is a schematic diagram of the telephone hybrid circuitry and hook switch relay.
Figure 19:
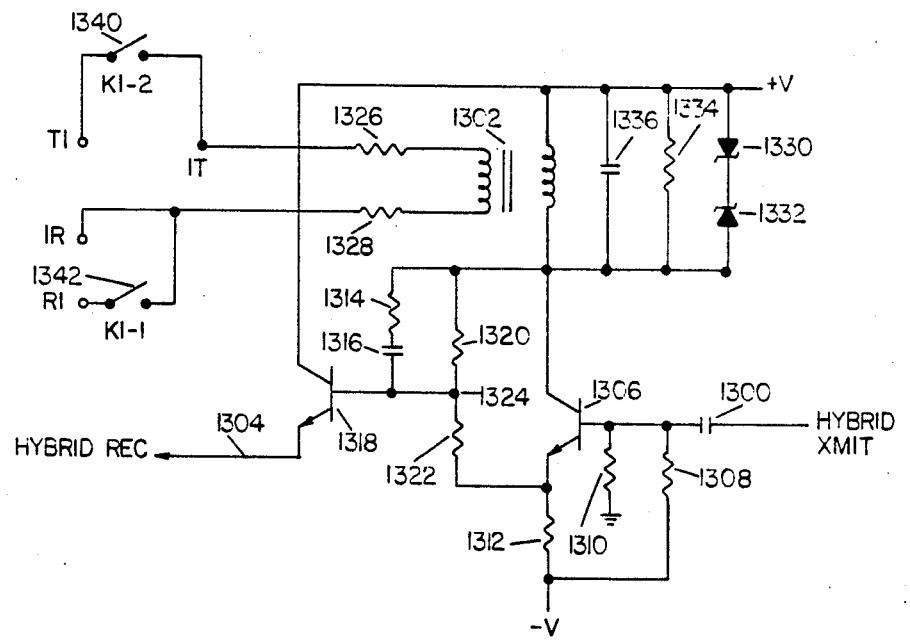

| COMPONENT | IDENTIFICATION |
|---|---|
| C 1132 | .22 μF |
| FIG. 17 | |
| R 1134 | 360K |
| C 1136 | 3.9 μF ± 20% TAN |
| R 1140 | 200K |
| R 1146 | 10K |
| C 1148 | 0.047 μF |
| C 1150 | 0.022 μF, 10% |
| R 1152 | 15K |
| C 1154 | 0.1 μF, 10% |
| R 1156 | 4K 3 |
| R 1160 | 300K |
| R 1166 | 22K |
| C 1168 | 0.022 μF |
| R 1172 | 100K |
| C 1174 | 0.0047 μF |
| C 1176 | 0.047 μF |
| R 1184 | 43K |
| R 1186 | 12K |
| R 1188 | 24K |
| R 1196 | 500K |
| R 1198 | 3K 6 |
| R 1200 | 2K 7 |
| R 1202 | 15 M |
| R 1206 | 3K |
| R 1208 | L.S. |
| C 1210 | 0.47 μF, 10% |
| C 1212 | 0.47 μF |
| C 1214 | 0.01 μF, 10% |
| FIG. 18 | |
| R 1220 | 10K, 1% |
| R 1222 | 5K |
| R 1224 | 22K |
| R 1226 | 15K |
| C 1228 | 0.1 μF, 10% |
| R 1230 | 10K, 1% |
| C 1232 | 0.1 μF, 10% |
| C 1234 | 0.33 μF, 10% |
| R 1238 | 24K |
| R 1240 | 24K |
| C 1244 | 0.1 μF, 10% |
| C 1246 | 0.33 μF, 10% |
| R 1248 | 10K |
| R 1250 | 43K |
| R 1252 | 24K |
| R 1258 | 1K |
| R 1260 | 68K |
| R 1262 | 1K |
| C 1264 | 0.47 μF, 10% |
| R 1268 | 8 Ω 1 W |
| R 1270 | 2.7 Ω |
| C 1272 | 0.1 μF, 10% |
| C 1274 | 220 μF |
| R 1282 | 10K |
| R 1284 | 10K |
| R 1288 | 10K |
| R 1290 | 100K |
| R 1292 | 1K |
| C 1294 | 1 μF TANT |
| C 1296 | 6.8 μF 25 V |
| FIG. 19 | |
| R 1308 | 12K |
| R 1310 | 9K 1 |
| R 1312 | 1K 5 |
| R 1314 | 30K |
| C 1316 | 0.00 33 μF, 10% |
| R 1320 | 5K 1 |
| R 1322 | 22K |
| R 1326 | 56K |
| R 1328 | 56K |
| R 1334 | 680K |
| C 1336 | 0.015 μF, 10% |
| K 1338 | +18 RET |
| R 1348 | 5K 6 |
| R 1350 | 10K |
| FIG. 20 | |

-continued

TABLE OF COMPONENTS

C = Capacitor  D = Diode
Q = Transistor  R = Resistor  L = Inductor

| COMPONENT | IDENTIFICATION |
|---|---|
| R 1356 | 200K |
| C 1358 | 0.001 µF |
| R 1364 | 220K |
| C 1366 | 0.05 µF |
| C 1372 | 0.05 µF |
| C 1382 | 0.05 µF |
| R 1384 | 220K |
| R 1428 | 200K |
| R 1430 | 2.2 M |
| C 1432 | 0.05 µF |
| R 1444 | 10K |
| R 1448 | 10K |
| R 1458 | 10K |
| FIG. 21 | |
| Q 1400 | 2N 2222 |
| Q 1402 | 2N 2222 |
| Q 1404 | 2N 2222 |
| Q 1406 | 2N 2222 |
| R 1408 | 680 Ω |
| R 1410 | 680 Ω |
| R 1412 | 680 Ω |
| R 1414 | 680 Ω |
| R 1462 | 71.5K, 1% |
| R 1464 | 9.09K, 1% |
| R 1466 | 1.27K, 1% |
| R 1473 | 10K, 5% |
| C 1475 | .1 µF |
| R 1478 | 2K |
| R 1479 | 1.8K |
| R 1480 | 10K |
| R 1481 | LABSET |
| R 1482 | 270 Ω |

The foregoing description of the present invention has been directed primarily to a particular preferred embodiment for purposes of explanation and illustration. It will be apparent, however, to those skilled in this art that the present invention may be more broadly applied and embodied in communication instruments and apparatus other than a speakerphone subscriber's instrument. For example, the remote microphone unit (FIG. 1) may also contain a keyboard set for generating tones for use in dialing, or in providing features such as call transfer (through an appropriate PBX) call forwarding, etc. There may also be included buttons for such functions as holding calls and in redialing telephone numbers. Furthermore, the transmit circuit in the remote microphone unit, which produces diffuse infrared radiation carrier transmissions of voice, and the receive circuit in the base station, which operates to recover voice from an infrared radiation carrier transmission, may be implemented otherwise than as described herein. Additionally, the various carrier present, sub-carrier shift, and voice present detection circuits shown may be implemented otherwise than as described.

Many uses and modifications of the present invention will be apparent to those skilled in the art. It is the intention in the following claims to cover all such equivalent modifications and variations as fall within the scope of the invention.

What is claimed is:

1. A telephone communication instrument comprising:
    a remote microphone unit including
        a microphone for converting an acoustic voice signal into a representative remote microphone electrical voice signal,
        an infrared radiation source for producing an infrared radiation transmission carrier,
        a driver circuit for driving the source,
        a modulated signal generator coupled to the microphone, for producing a sub-carrier signal frequency-modulated by the remote microphone electrical voice signal, said modulated sub-carrier signal being applied through sdid driver to said infrared radiation source and used to amplitude-modulate the infrared radiation transmission carrier, thereby producing infrared radiation carrier transmission of said remote microphone electrical voice signal, and
        means controlling the driver circuit, for enabling infrared radiation carrier transmission during the presence of a voice signal and for disabling carrier transmission upon cessation of the voice signal; and
    a base station unit including
        a microphone for converting an ambient acoustic signal into a representative local microphone electrical signal,
        an infrared radiation detector responsive to the infrared radiation transmission carrier from the remote microphone unit, for producing an electrical signal representative of the frequency-modulated sub-carrier signal embodied in a remote microphone unit infrared radiation carrier transmission,
        a demodulator for producing from the frequency-modulated sub-carrier electrical detector signal a demodulator output signal that is a reproduction of the remote microphone electrical voice signal,
        an audio frequency detector coupled to the output of the demodulator, for indicating the presence of a remote microphone electrical voice signal,
        a noise level detector coupled to the output of the demodulator, for indicating the presence of an infrared radiation carrier transmission,
        a logic circuit for determining the simultaneous presence of an infrared radiation carrier transmission from the remote microphone unit and a remote microphone electrical voice signal therein, and
        a switch controlled by the logic circuit, for accessing either the demodulator output signal or the local microphone electrical signal, to be made available, said switch accessing the remote microphone electrical voice signal during infrared radiation carrier transmission of remote microphone electrical signals and accessing the local microphone electrical voice signal in the absence of an infrared radiation carrier transmission of the remote microphone electrical voice signal.

2. A telephone communication instrument, comprising:
    a remote microphone unit including
        a microphone for converting an acoustic voice signal into a representative remote microphone electrical voice signal,
        means for infrared radiation carrier transmission of said remote microphone electrical voice signal; and
    a base station unit including
        means for determining the presence of an infrared radiation carrier transmission from the remote microphone unit and producing a signal indicative thereof, means for recovering remote microphone electrical voice signals from infrared radiation carrier transmissions originating at said remote microphone unit, a microphone for converting an acoustic voice signal into a representative local microphone electrical signal, means for selectively accessing said local and remote microphone electrical signals for presentation to a telephone line in response to the signal produced by the carrier presence determining means, said means accessing the remote microphone electrical signal upon determination of the presence of an infrared radiation carrier transmission of remote microphone electrical voice signals and accessing the local microphone electrical voice signal upon determination of an absence of an infrared radiation carrier transmission of the remote microphone electrical voice signal.

3. A speakerphone, comprising:

a remote microphone unit for infrared radiation carrier transmission of an electrical voice signal representative of a user's voice;

a local microphone for converting an ambient acoustic signal into a representative local microphone electrical signal;

means for recovering a remote microphone electrical voice signal from an infrared radiation carrier transmission originating at the remote microphone unit;

means for monitoring the signal-to-noise ratio in the recovery of remote microphone electrical voice signals, and producing a signal indicative of an unsatisfactory carrier transmission; and means responsive to the signal produced by said monitoring means, for selectively accessing the recovered remote microphone electrical voice signal or the local microphone electrical signal for presentation to a telephone line, said means accessing the local microphone electrical signal upon the indication of an unsatisfactory infrared radiation carrier transmission from the remote microphone unit.

4. A speakerphone, comprising:

a remote microphone unit for infrared radiation carrier transmission of an electrical voice signal representative of a user's voice;

a local microphone for receiving an acoustic voice signal and producing a representative local microphone electrical voice signal;

means for detecting an infrared radiation carrier transmission from the remote microphone unit and recovering therefrom a remote microphone electrical voice signal;

means for monitoring the signal-to-noise ratio of the recovered remote microphone electrical voice signal and producing an output signal indicative thereof; and means responsive to the signal produced by said monitoring means, for accessing either the recovered remote microphone electrical voice signal or the local microphone electrical voice signal for presentation to a telephone line.

5. A speakerphone, comprising:

a remote microphone unit including a microphone for converting an acoustic voice signal into a representative remote microphone electrical voice signal, means for infrared radiation carrier transmission of said remote microphone electrical voice signal; and a base station unit including means for recovering remote microphone electrical voice signals from infrared radiation carrier transmissions originating at said remote microphone unit;

a microphone for converting an acoustic voice signal into a representative local microphone electrical signal, means coupled to said signal recovering means, for determining the presence of an infrared radiation carrier transmission, means coupled to said carrier present determining means, for switching to either the local or the remote microphone electrical voice signal depending upon the results of the determination.

* * * * *

UNITED STATES PATENT AND TRADEMARK OFFICE
CERTIFICATE OF CORRECTION

PATENT NO. : 4,543,665

DATED : September 24, 1985

INVENTOR(S) : James M. Soleto, Peter J. Porozoff

It is certified that error appears in the above-identified patent and that said Letters Patent is hereby corrected as shown below:

In Column 2, line 22, begin a new paragraph beginning with the words "If the instrument uses..."

In Column 5, line 18, delete the word "of" and insert therefor the word --if--; in line 12, delete the number "200" and insert therefor the number --120--.

In Column 7, line 9, delete the punctuation mark "." and insert therefor the punctuation mark --,--.

In Column 12, line 4, delete the word "drop" and insert therefor the word --drops--.

In Column 15, line 6, delete the word "collects" and insert therefor the word --connects--.

In Column 27, line 40, delete the word "one" and insert therefor the word --on--; in line 55, delete the words "Switch signal. To go" and insert therefor the words --Switch signal to go--.

UNITED STATES PATENT AND TRADEMARK OFFICE
CERTIFICATE OF CORRECTION

PATENT NO. : 4,543,665

DATED : September 24, 1985

INVENTOR(S) : James M. Soleto, Peter J. Porozoff

It is certified that error appears in the above-identified patent and that said Letters Patent is hereby corrected as shown below:

In Column 33, for the identification of component R 1072, delete the characters "1%" and insert therefor the characters --1M, 1%--.

In Column 36, line 8, delete the word "sdid" and insert therefor the word --said--.

Signed and Sealed this

Eleventh Day of February 1986

[SEAL]

Attest:

DONALD J. QUIGG

Attesting Officer

Commissioner of Patents and Trademarks